United States Patent
Zhao et al.

(10) Patent No.: US 12,537,972 B2
(45) Date of Patent: *Jan. 27, 2026

(54) BILATERAL MATCHING BASED SCALING FACTOR DERIVATION FOR JMVD

(71) Applicant: TENCENT AMERICA LLC, Palo Alto, CA (US)

(72) Inventors: Liang Zhao, Palo Alto, CA (US); Xin Zhao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,995

(22) Filed: Feb. 2, 2024

(65) Prior Publication Data
US 2024/0244250 A1    Jul. 18, 2024

Related U.S. Application Data

(63) Continuation of application No. 17/982,171, filed on Nov. 7, 2022, now Pat. No. 11,936,903.
(Continued)

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/13* (2014.11); *H04N 19/139* (2014.11); *H04N 19/156* (2014.11); *H04N 19/176* (2014.11); *H04N 19/30* (2014.11); *H04N 19/70* (2014.11); *H04N 19/88* (2014.11)

(58) Field of Classification Search
CPC ...... H04N 19/52; H04N 19/105; H04N 19/13; H04N 19/139; H04N 19/156; H04N 19/176; H04N 19/30; H04N 19/70; H04N 19/88
See application file for complete search history.

(56) References Cited

U.S. PATENT DOCUMENTS

2013/0170553 A1    7/2013  Chen et al.
2014/0286433 A1*   9/2014  He .................. H04N 19/53
                                                         375/240.16
(Continued)

OTHER PUBLICATIONS

Elliott Karpilovsky et al., "Proposal: New Inter Modes for AV2", Google, 2021, CWG-B018_v1, 6 pages.
(Continued)

*Primary Examiner* — Jae N Noh
(74) *Attorney, Agent, or Firm* — Sughrue Mion, PLLC

(57) ABSTRACT

A method for video coding includes obtaining a coding block of video data, determining whether a joint coding of motion vector difference (JMVD) is used for predicting the coding block, obtaining, based on determining that the JMVD is used for predicting the coding block, a list of scaling factors and the JMVD from the video bitstream, deriving a predicted scaling factor based on the list of scaling factors, deriving a motion vector difference (MVD) for a reference list based on at least the joint motion vector difference and the predicted scaling factor, and reconstructing the coding block based on the derived MVD.

20 Claims, 15 Drawing Sheets

Related U.S. Application Data

(60) Provisional application No. 63/332,563, filed on Apr. 19, 2022.

(51) Int. Cl.
  *H04N 19/13* (2014.01)
  *H04N 19/139* (2014.01)
  *H04N 19/156* (2014.01)
  *H04N 19/176* (2014.01)
  *H04N 19/30* (2014.01)
  *H04N 19/70* (2014.01)
  *H04N 19/88* (2014.01)

(56) References Cited

U.S. PATENT DOCUMENTS

| | | |
|---|---|---|
| 2015/0382010 A1 | 12/2015 | Rapaka et al. |
| 2018/0098063 A1 | 4/2018 | Chen et al. |
| 2018/0278951 A1 | 9/2018 | Seregin et al. |
| 2019/0230350 A1 | 7/2019 | Chen et al. |
| 2022/0014753 A1 | 1/2022 | Bossen et al. |
| 2023/0328227 A1* | 10/2023 | Zhao .................... H04N 19/176 375/240.02 |
| 2023/0328275 A1* | 10/2023 | Zhao .................... H04N 19/30 375/240.16 |

OTHER PUBLICATIONS

Leo Zhao et al., "Improved adaptive MVD resolution", Tencent, 2022, CWG-C011, 7 pages.

International Search Report issued Mar. 30, 2023 in Application No. PCT/US2022/049238.

Yue Chen et al., "An Overview of Core Coding Tools in the AV1 Video Codec", 2018 Picture Coding Symposium (PCS), 2018, pp. 41-45, IEEE.

Leo Zhao et al., "Advanced motion vector difference", Tencent, 2021, CWG-B092, 7 pages.

Written Opinion issued Mar. 30, 2023 in Application No. PCT/US2022/049238.

Peter De Rivaz et al., "AV1 Bitstream & Decoding Process Specification", AV1 Bitstream & Decoding Process Specification, 2018, 681 pages.

Xin Zhao et al., "Tool Description for AV1 and libaom", Tencent, Google, Netflix, 2021, CWG-B078_v1, 41 pages.

Liang Zhao, et al., "Advanced Motion Vector Difference Coding Beyond AV1", IEEE International Conference on Image Processing (ICIP), 2022, pp. 3631-3635 (8 pages).

Lester Ku et al, "Optical Flow Motion Vector Refinement for AV2", Google, 2021, CWG-B041_v3, 11 pages.

Benjamin Bross et al., "Versatile Video Coding Editorial Refinements on Draft 10", Joint Video Experts Team (JVET) of ITU-T SG 16 WP 3 and ISO/IEC JTC 1/SC 29, 2020, JVET-T2001-v2, 512 pages.

* cited by examiner

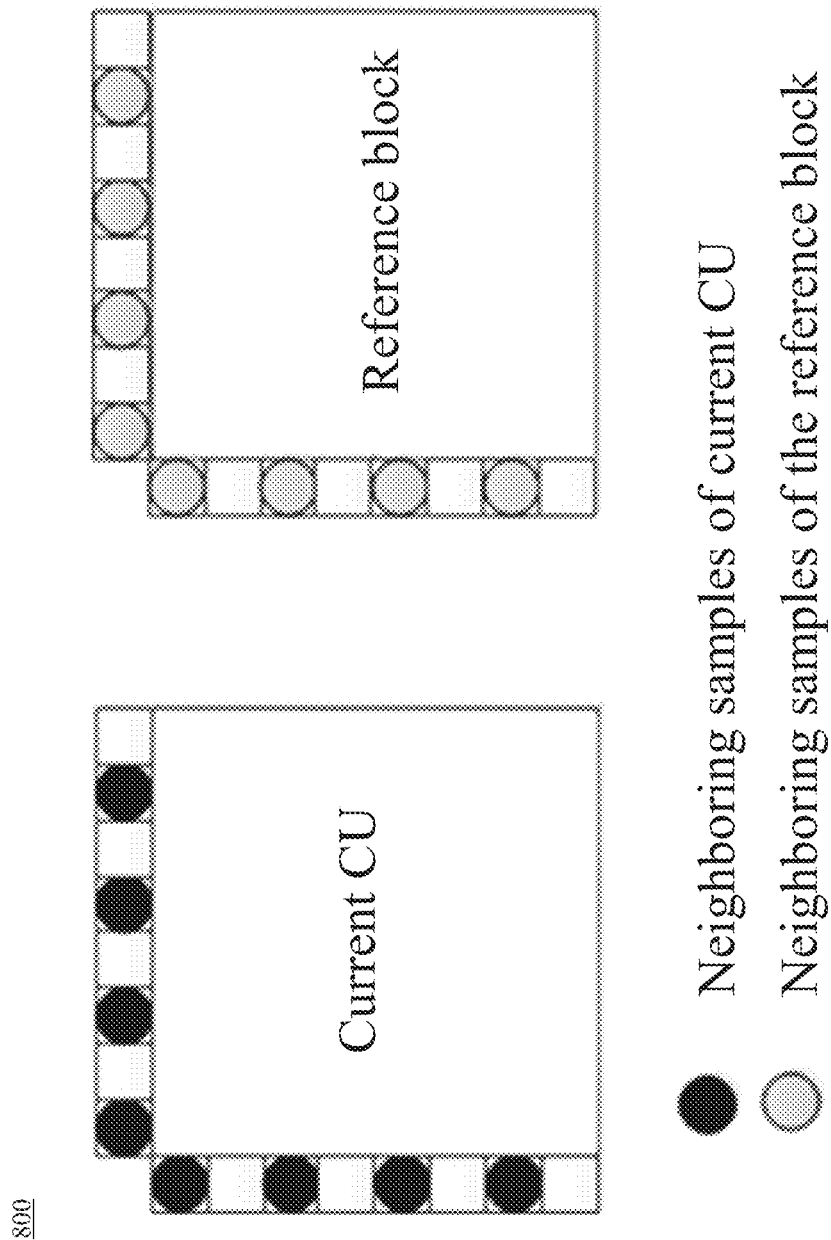

901

900

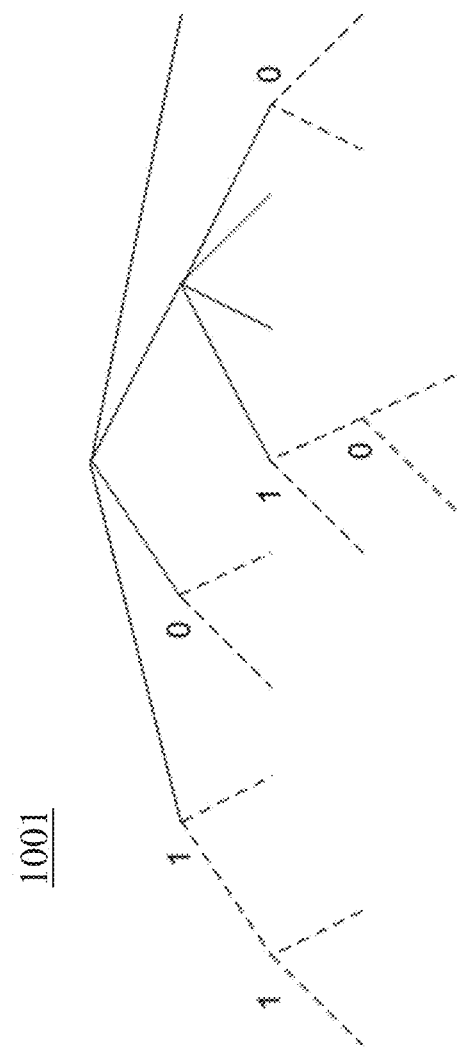
Fig. 10A
Fig. 10B
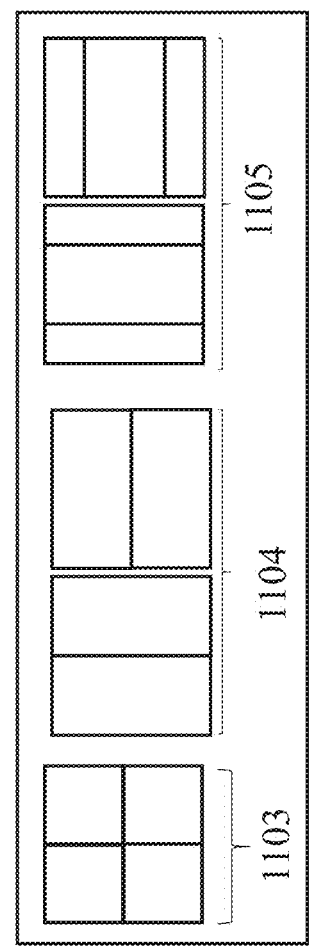
Fig. 10C

BILATERAL MATCHING BASED SCALING FACTOR DERIVATION FOR JMVD

CROSS REFERENCE TO RELATED APPLICATION

This is a Continuation of U.S. application Ser. No. 17/982,171 filed on Nov. 7, 2022, which claims priority to U.S. Provisional Application No. 63/332,563 filed on Apr. 19, 2022 which are hereby expressly incorporated by reference, in their entireties, into the present application.

BACKGROUND

1. Field

The present disclosure is directed to a set of advanced image and video coding technologies, and more specifically, to improved schemes for joint coding of motion vector difference (JMVD).

2. Description of Related Art

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala already published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then they have been studying the potential need for standardization of future video coding technology which could significantly outperform HEVC in compression capability. In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET (Joint Video Exploration Team—Joint Video Expert Team) meeting. With careful evaluation, JVET formally launched the standardization of next-generation video coding beyond HEVC, i.e., the so-called Versatile Video Coding (VVC).

And for JMVD, there are technical problems in assuming linear motion in JMVD coding modes as the motion between two reference frames may not be always linear motion, and, for example, the motion could become slower or faster from backward reference frame to forward reference frame. Therefore, there is a desire for a technical solution to such problems.

SUMMARY

According to an aspect of some embodiments, there is provided a method for video coding performed by at least one processor. The method comprises obtaining a coding block of a video bitstream, determining whether a joint coding of motion vector difference (JMVD) is used for predicting the coding block, obtaining, based on determining that the JMVD is used for predicting the coding block, a list of scaling factors and the JMVD from the video bitstream, generating, for each of the scaling factors in the list of scaling factors, prediction blocks, and signaling a selection of one of the scaling factors based on weighing differences between a cost criterion and respective ones of the prediction blocks.

According to other aspects of some embodiments, there is also provided an apparatus and computer readable medium consistent with the method.

BRIEF DESCRIPTION OF THE DRAWINGS

Further features, nature, and various advantages of the disclosed subject matter will be more apparent from the following detailed description and the accompanying drawings in which:

FIG. 8 is a simplified illustration of a diagram in accordance with some embodiments;

FIG. 10A is a simplified illustration of a diagram in accordance with some embodiments;

FIG. 10B is a simplified illustration of a diagram in accordance with some embodiments;

FIG. 10C is a simplified illustration of a diagram in accordance with some embodiments;

DETAILED DESCRIPTION

Figure 1:
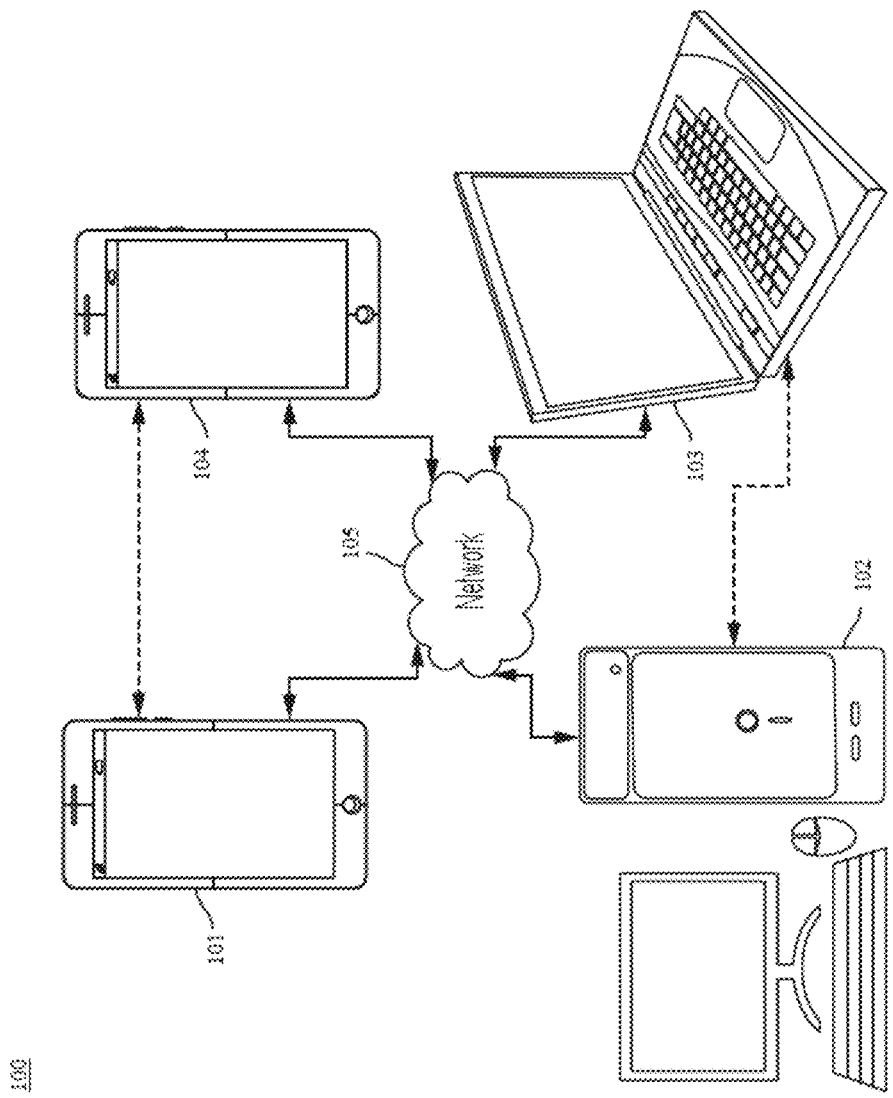
FIG. 1 is a simplified illustration of a diagram in accordance with some embodiments.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

To address one or more different technical problems, according to some embodiments, there is provided a method and apparatus comprising memory configured to store computer program code and a processor or processors configured to access the computer program code and operate as instructed by the computer program code. The computer program code includes obtaining code configured to cause the at least one hardware processor to obtain a coding block of a video bitstream, determining code configured to cause the at least one hardware processor to determine whether a joint coding of motion vector difference (JMVD) is used for predicting the coding block, further obtaining code configured to cause the at least one hardware processor to obtain, in response to determining that the JMVD is used for predicting the coding block, a list of scaling factors and the JMVD from the video bitstream, deriving code configured to cause the at least one hardware processor to derive a predicted scaling factor based on the list of scaling factors, further deriving code configured to cause the at least one hardware processor derive to a motion vector difference (MVD) for a reference list based on at least the joint motion vector difference and the predicted scaling factor, and reconstructing code configured to cause the at least one hardware processor to reconstruct the coding block based on the derived MVD.

According to some embodiments, the computer program code further comprises generating code configured to cause the at least one hardware processor to generate, for each of the scaling factors in the list of scaling factors, prediction blocks, and signaling code configured to cause the at least one hardware processor to signal a selection of one of the scaling factors based on weighing differences between a cost criterion and respective ones of the prediction blocks, wherein the prediction blocks are generated based on respective ones of the scaling factors.

According to some embodiments, ones of the prediction blocks are generated based on a motion vector equal to a sum of a motion vector prediction and a scaled motion vector difference that is scaled by one of the scaling factors.

According to some embodiments, the cost criterion is based on at least one of a sum of absolute difference (SAD), a sum of squared error (SSE), and a sum of absolute transform difference (SATD).

According to some embodiments, the computer program code includes further signaling code configured to cause the at least one hardware processor to signal at least one of an index and a flag of the one of the scaling factors, and entropy coding code configured to cause the at least one hardware processor to entropy code the flag based on the at least one of the scaling factors.

According to some embodiments, the computer program code includes additional signaling code configured to cause the at least one hardware processor to signal whether signaling of the at least one of the index and the flag is either explicit or implicit in a bitstream.

According to some embodiments, the computer program code includes reordering code configured to cause the at least one hardware processor to reorder the scaling factors, and further signaling code configured to cause the at least one hardware processor to signal an index of the reordered scaling factors.

According to some embodiments, the scaling factors are derived based on at least one of a quantization step size, a quantization parameter, a block size, an inter prediction mode, a motion vector difference (MVD) class, an MVD resolution, a reference picture, a motion vector prediction (MVP) index, and an MVD scaling factor of neighboring blocks.

According to some embodiments, the computer program code includes deriving code configured to cause the at least one hardware processor to derive a motion vector prediction (MVP) of at least one coding block, following the coding block, based on the one of the scaling factors.

According to some embodiments, the computer program code the selection of the one of the scaling factors is signaled in at least one of a frame header, a slice header, and a sequence header.

FIG. 1 illustrates a simplified block diagram of a communication system 100 according to an embodiment of the present disclosure. The communication system 100 may include at least two terminals 102 and 103 interconnected via a network 105. For unidirectional transmission of data, a first terminal 103 may code video data at a local location for transmission to the other terminal 102 via the network 105. The second terminal 102 may receive the coded video data of the other terminal from the network 105, decode the coded data and display the recovered video data. Unidirectional data transmission may be common in media serving applications and the like.

FIG. 1 illustrates a second pair of terminals 101 and 104 provided to support bidirectional transmission of coded video that may occur, for example, during videoconferencing. For bidirectional transmission of data, each terminal 101 and 104 may code video data captured at a local location for transmission to the other terminal via the network 105. Each terminal 101 and 104 also may receive the coded video data transmitted by the other terminal, may decode the coded data and may display the recovered video data at a local display device.

In FIG. 1, the terminals 101, 102, 103 and 104 may be illustrated as servers, personal computers and smart phones but the principles of the present disclosure are not so limited. Embodiments of the present disclosure find application with laptop computers, tablet computers, media players and/or dedicated video conferencing equipment. The network 105 represents any number of networks that convey coded video data among the terminals 101, 102, 103 and 104, including for example wireline and/or wireless communication networks. The communication network 105 may exchange data in circuit-switched and/or packet-switched channels. Representative networks include telecommunications networks, local area networks, wide area networks and/or the Internet. For the purposes of the present discussion, the architecture and topology of the network 105 may be immaterial to the operation of the present disclosure unless explained herein below.

Figure 2:
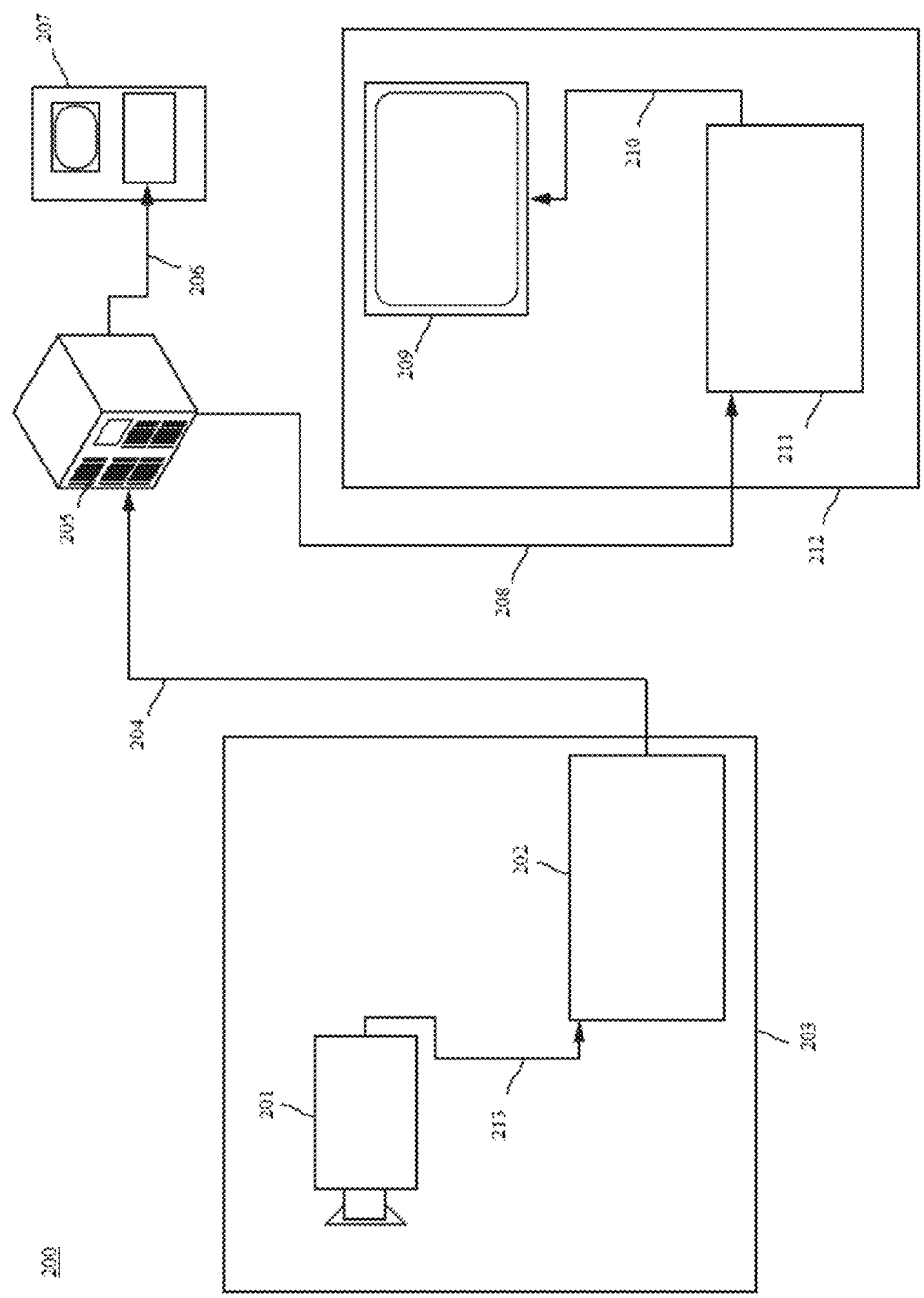
FIG. 2 is a simplified illustration of a diagram in accordance with some embodiments.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem 203, that can include a video source 201, for example a digital camera, creating, for example, an uncompressed video sample stream 213. That sample stream 213 may be emphasized as a high data volume when compared to encoded video bitstreams and can be processed by an encoder 202 coupled to the camera 201. The encoder 202 can include hardware, software, or a combination thereof to enable or implement aspects of the disclosed subject matter as described in more detail below. The encoded video bitstream 204, which may be emphasized as a lower data volume when compared to the sample stream, can be stored on a streaming server 205 for future use. One or more streaming clients 212 and 207 can access the streaming server 205 to retrieve copies 208 and 206 of the encoded video bitstream 204. A client 212 can include a video decoder 211 which decodes the incoming copy of the encoded video bitstream 208 and creates an outgoing video sample stream 210 that can be rendered on a display 209 or other rendering device (not depicted). In some streaming systems, the video bitstreams 204, 206 and 208 can be encoded according to certain video coding/compression standards. Examples of those standards are noted above and described further herein.

Figure 3:
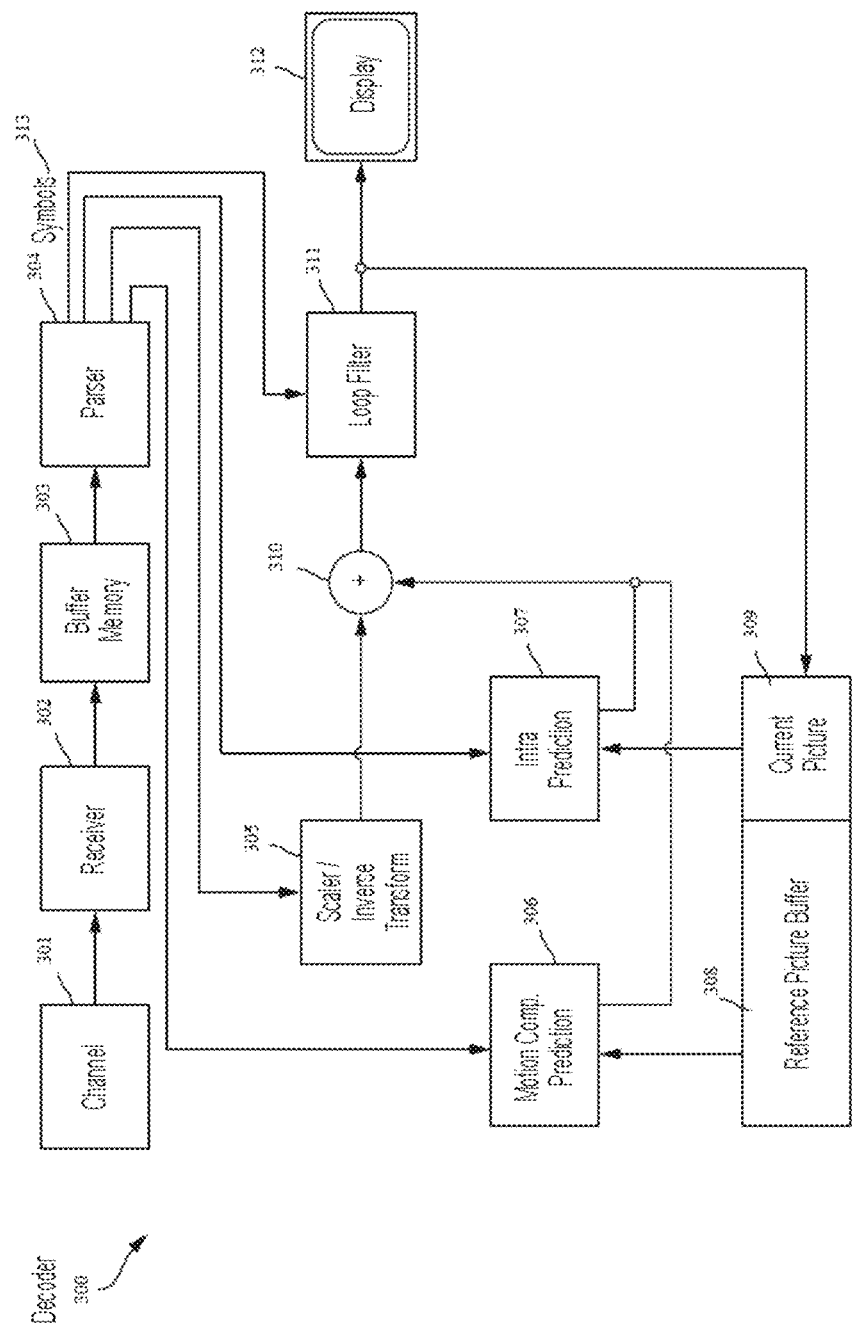
FIG. 3 is a simplified illustration of a diagram in accordance with some embodiments.

FIG. 3 may be a functional block diagram of a video decoder 300 according to an embodiment of the present invention.

A receiver 302 may receive one or more codec video sequences to be decoded by the decoder 300; in the same or another embodiment, one coded video sequence at a time, where the decoding of each coded video sequence is independent from other coded video sequences. The coded video sequence may be received from a channel 301, which may be a hardware/software link to a storage device which stores the encoded video data. The receiver 302 may receive the encoded video data with other data, for example, coded audio data and/or ancillary data streams, that may be forwarded to their respective using entities (not depicted). The receiver 302 may separate the coded video sequence from the other data. To combat network jitter, a buffer memory 303 may be coupled in between receiver 302 and entropy decoder/parser 304 ("parser" henceforth). When receiver 302 is receiving data from a store/forward device of sufficient bandwidth and controllability, or from an isosychronous network, the buffer 303 may not be needed, or can be small. For use on best effort packet networks such as the Internet, the buffer 303 may be required, can be comparatively large and can advantageously of adaptive size.

The video decoder 300 may include a parser 304 to reconstruct symbols 313 from the entropy coded video sequence. Categories of those symbols include information used to manage operation of the decoder 300, and potentially information to control a rendering device such as a display 312 that is not an integral part of the decoder but can be coupled to it. The control information for the rendering device(s) may be in the form of Supplementary Enhancement Information (SEI messages) or Video Usability Information parameter set fragments (not depicted). The parser 304 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 304 may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter values, motion vectors, and so forth.

The parser 304 may perform entropy decoding/parsing operation on the video sequence received from the buffer 303, so to create symbols 313. The parser 304 may receive encoded data, and selectively decode particular symbols 313. Further, the parser 304 may determine whether the particular symbols 313 are to be provided to a Motion Compensation Prediction unit 306, a scaler/inverse transform unit 305, an Intra Prediction Unit 307, or a loop filter 311.

Reconstruction of the symbols 313 can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser 304. The flow of such subgroup control information between the parser 304 and the multiple units below is not depicted for clarity.

Beyond the functional blocks already mentioned, decoder 300 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit 305. The scaler/inverse transform unit 305 receives quantized transform coefficient as well as control information, including which transform to use, block size, quantization factor, quantization scaling matrices, etc. as symbol(s) 313 from the parser 304. It can output blocks comprising sample values, that can be input into aggregator 310.

In some cases, the output samples of the scaler/inverse transform 305 can pertain to an intra coded block; that is: a block that is not using predictive information from previously reconstructed pictures, but can use predictive information from previously reconstructed parts of the current picture. Such predictive information can be provided by an intra picture prediction unit 307. In some cases, the intra picture prediction unit 307 generates a block of the same size and shape of the block under reconstruction, using surrounding already reconstructed information fetched from the current (partly reconstructed) picture 309. The aggregator 310, in some cases, adds, on a per sample basis, the prediction information the intra prediction unit 307 has generated to the output sample information as provided by the scaler/inverse transform unit 305.

In other cases, the output samples of the scaler/inverse transform unit 305 can pertain to an inter coded, and potentially motion compensated block. In such a case, a Motion Compensation Prediction unit 306 can access reference picture memory 308 to fetch samples used for prediction. After motion compensating the fetched samples in accordance with the symbols 313 pertaining to the block, these samples can be added by the aggregator 310 to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols 313 that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator 310 can be subject to various loop filtering techniques in the loop filter unit 311. Video compression technologies can include in-loop filter technologies that are controlled by parameters included in the coded video bitstream and made available to the loop filter unit 311 as symbols 313 from the parser 304, but can also be responsive to meta-information obtained during the decoding of previous (in decoding order) parts of the coded picture or coded video sequence, as well as responsive to previously reconstructed and loop-filtered sample values.

The output of the loop filter unit 311 can be a sample stream that can be output to the render device 312 as well as stored in the reference picture memory 557 for use in future inter-picture prediction.

Certain coded pictures, once fully reconstructed, can be used as reference pictures for future prediction. Once a coded picture is fully reconstructed and the coded picture has been identified as a reference picture (by, for example, parser 304), the current reference picture 309 can become part of the reference picture buffer 308, and a fresh current picture memory can be reallocated before commencing the reconstruction of the following coded picture.

The video decoder 300 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 302 may receive additional (redundant) data with the encoded video. The additional data may be included as part of the coded video sequence(s). The additional data may be used by the video decoder 300 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 4:
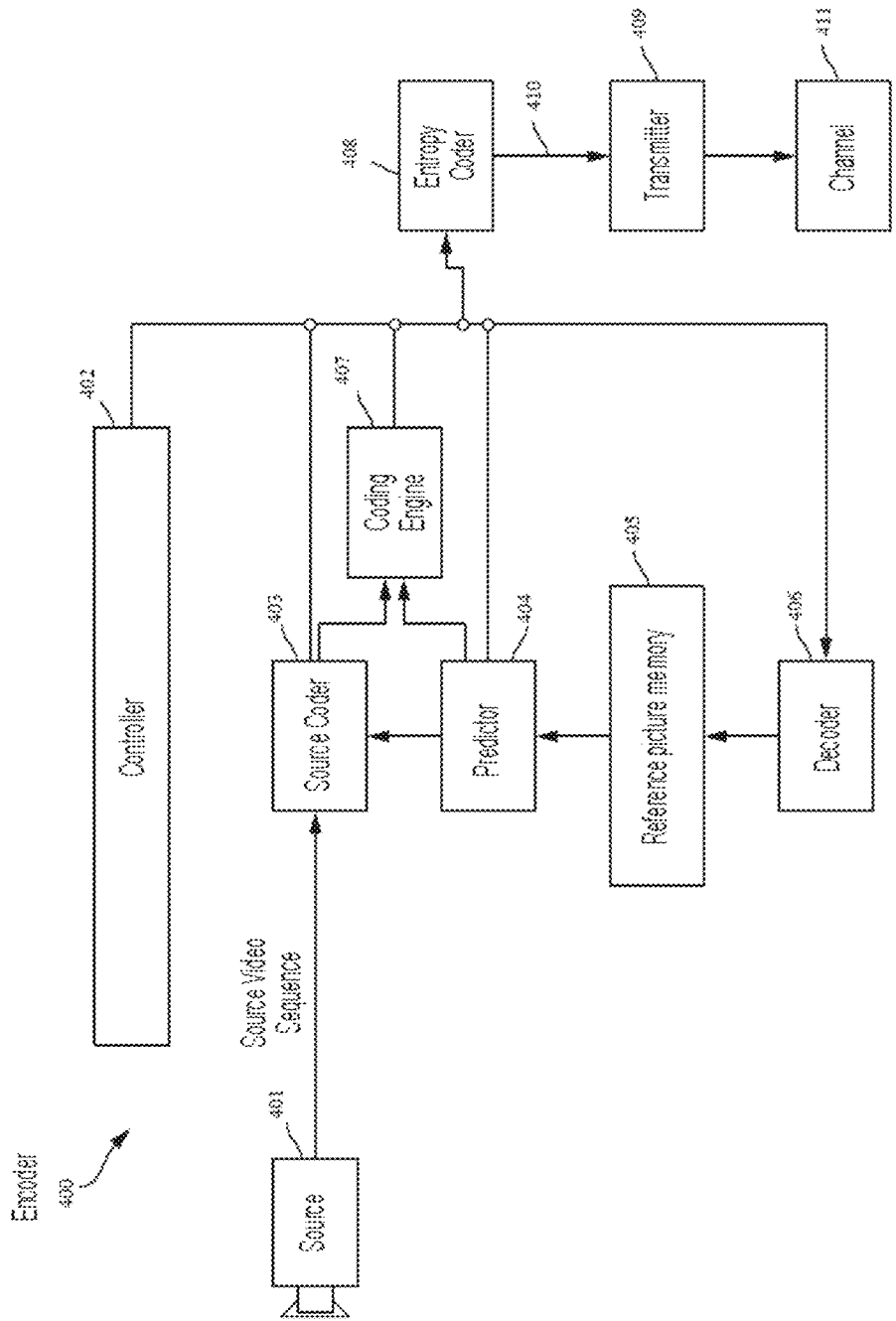
FIG. 4 is a simplified illustration of a diagram in accordance with some embodiments.

FIG. 4 may be a functional block diagram of a video encoder 400 according to an embodiment of the present disclosure.

The encoder 400 may receive video samples from a video source 401 (that is not part of the encoder) that may capture video image(s) to be coded by the encoder 400.

The video source 401 may provide the source video sequence to be coded by the encoder (303) in the form of a digital video sample stream that can be of any suitable bit depth (for example: 8 bit, 10 bit, 12 bit, ... ), any colorspace (for example, BT.601 Y CrCB, RGB, ... ) and any suitable sampling structure (for example Y CrCb 4:2:0, Y CrCb 4:4:4). In a media serving system, the video source 401 may be a storage device storing previously prepared video. In a videoconferencing system, the video source 401 may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder 400 may code and compress the pictures of the source video sequence into a coded video sequence 410 in real time or under any other time constraints as required by the application. Enforcing appropriate coding speed is one function of Controller 402. Controller controls other functional units as described below and is functionally coupled to these units. The coupling is not depicted for clarity. Parameters set by controller can include rate control related parameters (picture skip, quantizer, lambda value of rate-distortion optimization techniques, ... ), picture size, group of pictures (GOP) layout, maximum motion vector search range, and so forth. A person skilled in the art can readily identify other functions of controller 402 as they may pertain to video encoder 400 optimized for a certain system design.

Some video encoders operate in what a person skilled in the art readily recognizes as a "coding loop." As an oversimplified description, a coding loop can consist of the encoding part of an encoder 402 ("source coder" henceforth) (responsible for creating symbols based on an input picture to be coded, and a reference picture(s)), and a (local) decoder 406 embedded in the encoder 400 that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory 405. As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder 406 can be the same as of a "remote" decoder 300, which has already been described in detail above in conjunction with FIG. 3. Briefly referring also to FIG. 4, however, as symbols are available and en/decoding of symbols to a coded video sequence by entropy coder 408 and parser 304 can be lossless, the entropy decoding parts of decoder 300, including channel 301, receiver 302, buffer 303, and parser 304 may not be fully implemented in local decoder 406.

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder 403 may perform motion compensated predictive coding, which codes an input frame predictively with reference to one or more previously-coded frames from the video sequence that were designated as "reference frames." In this manner, the coding engine 407 codes differences between pixel blocks of an input frame and pixel blocks of reference frame(s) that may be selected as prediction reference(s) to the input frame.

The local video decoder 406 may decode coded video data of frames that may be designated as reference frames, based on symbols created by the source coder 403. Operations of the coding engine 407 may advantageously be lossy processes. When the coded video data may be decoded at a video decoder (not shown in FIG. 4), the reconstructed video sequence typically may be a replica of the source video sequence with some errors. The local video decoder 406 replicates decoding processes that may be performed by the video decoder on reference frames and may cause reconstructed reference frames to be stored in the reference picture cache 405. In this manner, the encoder 400 may store copies of reconstructed reference frames locally that have common content as the reconstructed reference frames that will be obtained by a far-end video decoder (absent transmission errors).

The predictor 404 may perform prediction searches for the coding engine 407. That is, for a new frame to be coded, the predictor 404 may search the reference picture memory 405 for sample data (as candidate reference pixel blocks) or certain metadata such as reference picture motion vectors, block shapes, and so on, that may serve as an appropriate prediction reference for the new pictures. The predictor 404 may operate on a sample block-by-pixel block basis to find appropriate prediction references. In some cases, as determined by search results obtained by the predictor 404, an input picture may have prediction references drawn from multiple reference pictures stored in the reference picture memory 405.

The controller 402 may manage coding operations of the video coder 403, including, for example, setting of parameters and subgroup parameters used for encoding the video data.

Output of all aforementioned functional units may be subjected to entropy coding in the entropy coder 408. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 409 may buffer the coded video sequence (s) as created by the entropy coder 408 to prepare it for transmission via a communication channel 411, which may be a hardware/software link to a storage device which would store the encoded video data. The transmitter 409 may merge coded video data from the video coder 403 with other data to be transmitted, for example, coded audio data and/or ancillary data streams (sources not shown).

The controller 402 may manage operation of the encoder 400. During coding, the controller 405 may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 400 may perform coding operations according to a predetermined video coding technology or standard, such as ITU-T Rec. H.265. In its operation, the video coder 400 may perform various compression operations, including predictive coding operations that exploit temporal and spatial redundancies in the input video sequence. The coded video data, therefore, may conform to a syntax specified by the video coding technology or standard being used.

In an embodiment, the transmitter 409 may transmit additional data with the encoded video. The source coder 403 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 5:
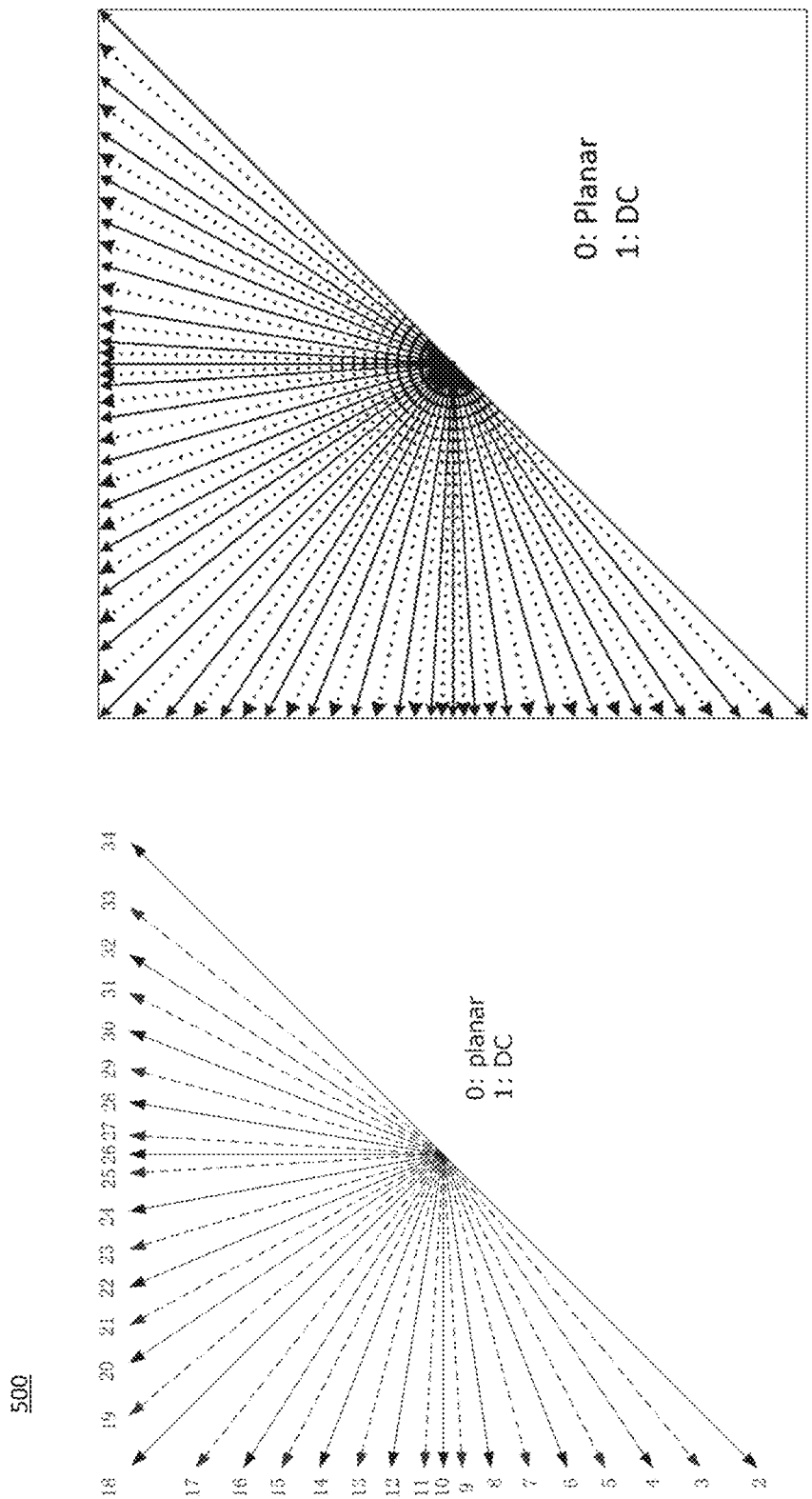
FIG. 5 is a simplified illustration of a diagram in accordance with some embodiments.

FIG. 5 illustrates intra prediction modes used in HEVC and JEM. To capture the arbitrary edge directions presented in natural video, the number of directional intra modes is extended from 33, as used in HEVC, to 65. The additional directional modes in JEM on top of HEVC are depicted as dotted arrows in FIG. 1 (b), and the planar and DC modes remain the same. These denser directional intra prediction modes apply for all block sizes and for both luma and chroma intra predictions. As shown in FIG. 5, the directional intra prediction modes as identified by dotted arrows, which is associated with an odd intra prediction mode index, are called odd intra prediction modes. The directional intra prediction modes as identified by solid arrows, which are associated with an even intra prediction mode index, are called even intra prediction modes. In this document, the directional intra prediction modes, as indicated by solid or dotted arrows in FIG. 5 are also referred as angular modes.

In JEM, a total of 67 intra prediction modes are used for luma intra prediction. To code an intra mode, an most probable mode (MPM) list of size 6 is built based on the intra modes of the neighboring blocks. If intra mode is not from the MPM list, a flag is signaled to indicate whether intra mode belongs to the selected modes. In JEM-3.0, there are 16 selected modes, which are chosen uniformly as every fourth angular mode. In JVET-D0114 and JVET-G0060, 16 secondary MPMs are derived to replace the uniformly selected modes.

Figure 6:
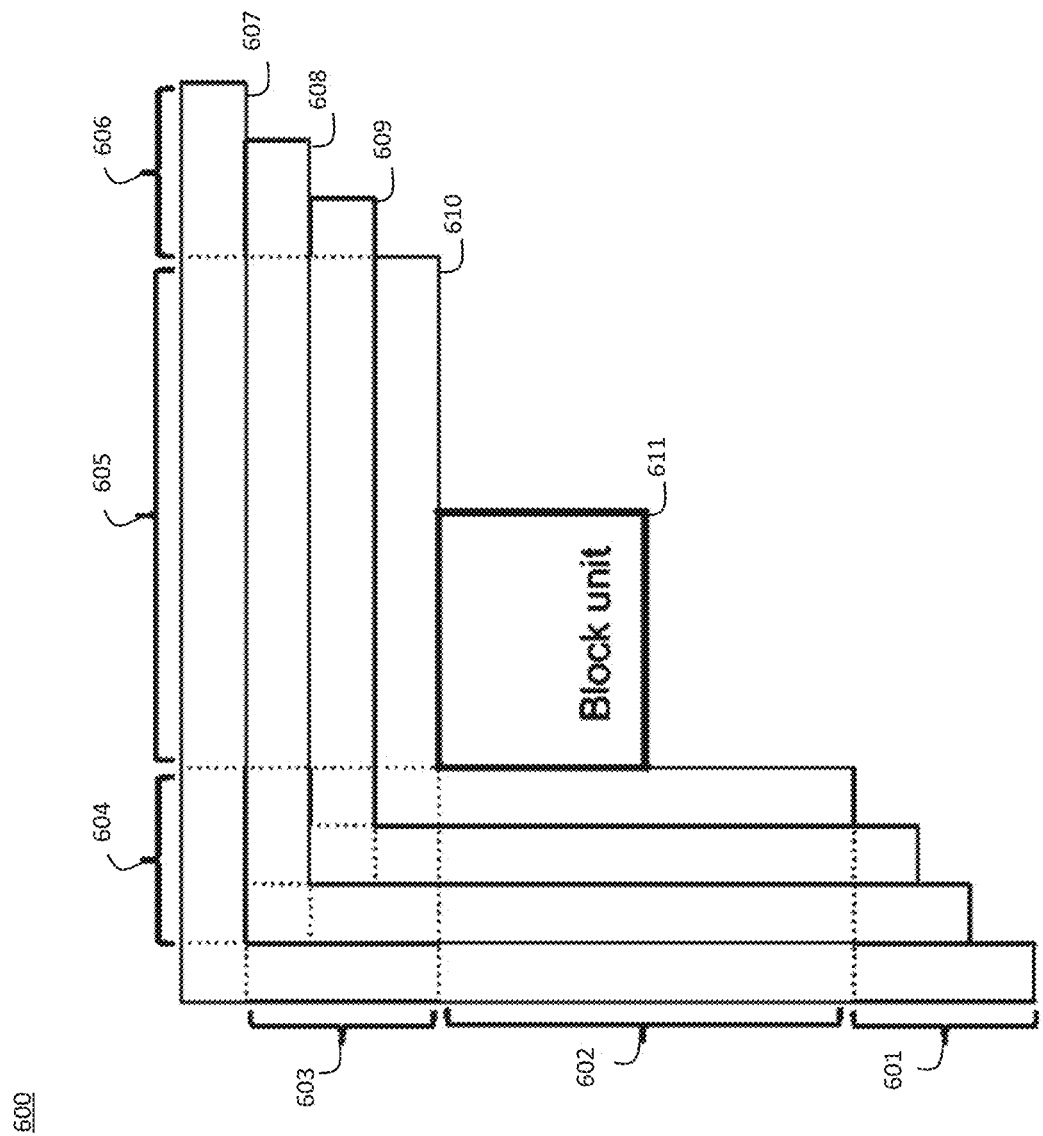
FIG. 6 is a simplified illustration of a diagram in accordance with some embodiments.

FIG. 6 illustrates N reference tiers exploited for intra directional modes. There is a block unit 611, a segment A 601, a segment B 602, a segment C 603, a segment D 604, a segment E 605, a segment F 606, a first reference tier 610, a second reference tier 609, a third reference tier 608 and a fourth reference tier 607.

In both HEVC and JEM, as well as some other standards such as H.264/AVC, the reference samples used for predicting the current block are restricted to a nearest reference line (row or column). In the method of multiple reference line intra prediction, the number of candidate reference lines (row or columns) are increased from one (i.e. the nearest) to N for the intra directional modes, where N is an integer greater than or equal to one. FIG. 2 takes 4×4 prediction unit (PU) as an example to show the concept of the multiple line intra directional prediction method. An intra-directional mode could arbitrarily choose one of N reference tiers to generate the predictors. In other words, the predictor p(x,y) is generated from one of the reference samples S1, S2, . . . , and SN. A flag is signaled to indicate which reference tier is chosen for an intra-directional mode. If N is set as 1, the intra directional prediction method is the same as the traditional method in JEM 2.0. In FIG. 6, the reference lines 610, 609, 608 and 607 are composed of six segments 601, 602, 603, 604, 605 and 606 together with the top-left reference sample. In this document, a reference tier is also called a reference line. The coordinate of the top-left pixel within current block unit is (0,0) and the top left pixel in the 1st reference line is (−1,−1).

In JEM, for the luma component, the neighboring samples used for intra prediction sample generations are filtered before the generation process. The filtering is controlled by the given intra prediction mode and transform block size. If the intra prediction mode is DC or the transform block size is equal to 4×4, neighboring samples are not filtered. If the distance between the given intra prediction mode and vertical mode (or horizontal mode) is larger than predefined threshold, the filtering process is enabled. For neighboring sample filtering, [1, 2, 1] filter and bi-linear filters are used.

A position dependent intra prediction combination (PDPC) method is an intra prediction method which invokes a combination of the un-filtered boundary reference samples and HEVC style intra prediction with filtered boundary reference samples. Each prediction sample pred[x][y] located at (x, y) is calculated as follows:

$$pred[x][y] = (wL * R_{-1,y} + wT * R_{x,-1} + \quad \text{(Eq. 2-1)}$$
$$wTL * R_{-1,-1} + (64 - wL - wT - wTL) * pred[x][y] + 32) \gg 6$$

where $R_{x,-1}, R_{-1,y}$ represent the unfiltered reference samples located at top and left of current sample (x, y), respectively, and $R_{-1,-1}$ represents the unfiltered reference sample located at the top-left corner of the current block. The weightings are calculated as below, $$wT = 32 \gg ((y \ll 1) \gg \text{shift}) \quad \text{(Eq. 2-2)}$$

$$wL = 32 \gg ((x \ll 1) \gg \text{shift}) \quad \text{(Eq. 2-3)}$$

$$wTL = -(wL \gg 4) - (wT \gg 4) \quad \text{(Eq. 2-4)}$$

$$\text{shift} = (\log 2(\text{width}) + \log 2(\text{height}) + 2) \gg 2. \quad \text{(Eq. 2-5)}$$

Figure 7:
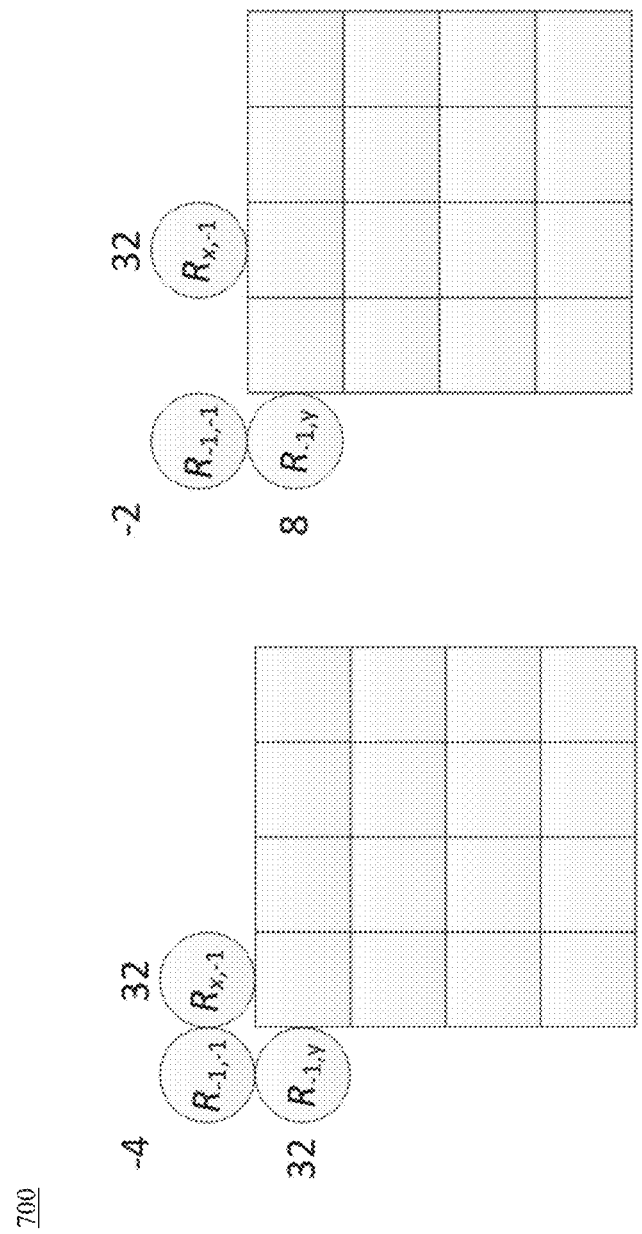
FIG. 7 is a simplified illustration of a diagram in accordance with some embodiments.

FIG. 7 illustrates a diagram 700 in which DC mode PDPC weights (wL, wT, wTL) for (0, 0) and (1, 0) positions inside one 4×4 block. If PDPC is applied to DC, planar, horizontal, and vertical intra modes, additional boundary filters are not needed, such as the HEVC DC mode boundary filter or horizontal/vertical mode edge filters. FIG. 7 illustrates the definition of reference samples Rx,−1, R−1,y and R−1,−1 for PDPC applied to the top-right diagonal mode. The prediction sample pred(x', y') is located at (x', y') within the prediction block. The coordinate x of the reference sample Rx,−1 is given by: x=x'+y'+1, and the coordinate y of the reference sample R−1,y is similarly given by: y=x'+y'+1.

FIG. 8 illustrates a Local Illumination Compensation (LIC) diagram 800 and is based on a linear model for illumination changes, using a scaling factor a and an offset b. And it is enabled or disabled adaptively for each inter-mode coded coding unit (CU).

When LIC applies for a CU, a least square error method is employed to derive the parameters a and b by using the neighboring samples of the current CU and their corresponding reference samples. More specifically, as illustrated in FIG. 8, the subsampled (2:1 subsampling) neighboring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighboring blocks, in a way similar to motion information copy in merge mode; otherwise, an LIC flag is signaled for the CU to indicate whether LIC applies or not.

Figure 9B:
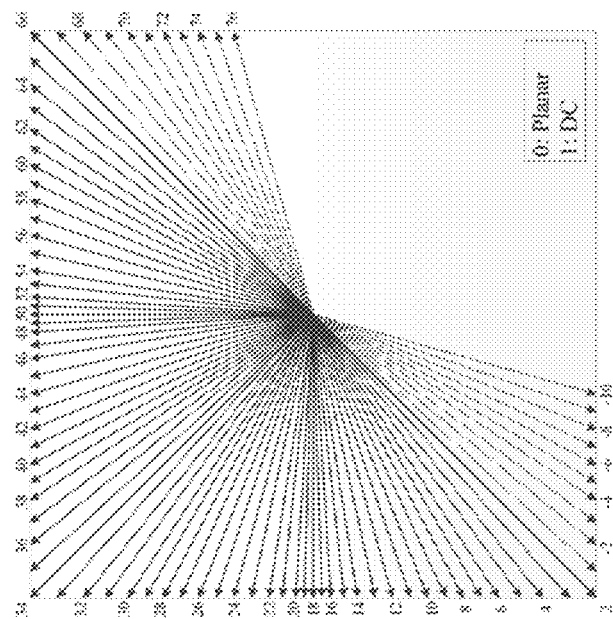
FIG. 9B is a simplified illustration of a diagram in accordance with some embodiments.
Figure 9A:
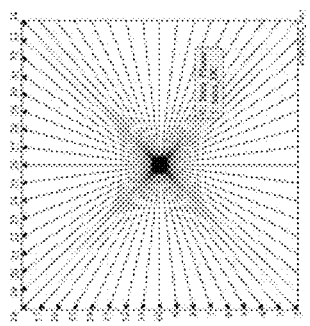
FIG. 9A is a simplified illustration of a diagram in accordance with some embodiments.

FIG. 9A illustrates intra prediction modes 900 used in HEVC. In HEVC, there are total 35 intra prediction modes, among which mode 10 is horizontal mode, mode 26 is vertical mode, and mode 2, mode 18 and mode 34 are diagonal modes. The intra prediction modes are signaled by three most probable modes (MPMs) and 32 remaining modes.

FIG. 9B illustrates, in embodiments of VVC, there are total 87 intra prediction modes where mode 18 is horizontal mode, mode 50 is vertical mode, and mode 2, mode 34 and mode 66 are diagonal modes. Modes −1~−10 and Modes 67~76 are called Wide-Angle Intra Prediction (WAIP) modes.

The prediction sample pred(x,y) located at position (x, y) is predicted using an intra prediction mode (DC, planar, angular) and a linear combination of reference samples according to the PDPC expression:

$$pred(x, y) = (wL \times R{-}1, y + wT \times Rx, -1 - wTL \times R{-}1,$$
$$-1 + (64 - wL - WT + wTL) \times pred(x, y) + 32 >> 6$$

where Rx,−1, R−1,y represent the reference samples located at the top and left of current sample (x, y), respectively, and R−1,−1 represents the reference sample located at the top-left corner of the current block.

For the DC mode the weights are calculated as follows for a block with dimensions width and height:

$$wT = 32 \gg ((y \ll 1) \gg nScale), wL = 32 \gg ((x \ll 1) \gg nScale), wTL =$$
$$(wL \gg 4) + (wT \gg 4),$$

with nScale=(log 2(width)−2+log 2(height)−2+2)>>2, where wT denotes the weighting factor for the reference sample located in the above reference line with the same horizontal coordinate, wL denotes the weighting factor for the reference sample located in the left reference line with the same vertical coordinate, and wTL denotes the weighting factor for the top-left reference sample of the current block, nScale specifies how fast weighting factors decrease along the axis (wL decreasing from left to right or wT decreasing from top to bottom), namely weighting factor decrement rate, and it is the same along x-axis (from left to right) and y-axis (from top to bottom) in current design. And 32 denotes the initial weighting factors for the neighboring samples, and the initial weighting factor is also the top (left or top-left) weightings assigned to top-left sample in current CB, and the weighting factors of neighboring samples in PDPC process should be equal to or less than this initial weighting factor.

For planar mode wTL=0, while for horizontal mode wTL=wT and for vertical mode wTL=wL. The PDPC weights can be calculated with adds and shifts only. The value of pred(x,y) can be computed in a single step using Eq. 1.

Herein the proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

FIG. 10A illustrates an example 1000 of block partitioning by using QTBT, and FIG. 10B illustrates the corresponding tree representation 1001. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In HEVC, a CTU is split into CUs by using a quadtree structure denoted as coding tree to adapt to various local characteristics. The decision on whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU.

According to embodiments, the QTBT structure removes the concepts of multiple partition types, i.e. it removes the separation of the CU, PU and TU concepts, and supports more flexibility for CU partition shapes. In the QTBT block structure, a CU can have either a square or rectangular shape. At the flow diagram 1100 of FIG. 11, according to exemplary embodiments, a coding tree unit (CTU) or CU, obtained at S11, is first partitioned by a quadtree structure at S12. The quadtree leaf nodes are further determined whether to be partitioned by a binary tree structure at S14, and if so, at S15, as described with FIG. 10C for example, there are two splitting types, symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In VVC, a CU sometimes consists of coding blocks (CBs) of different color components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices.

According to embodiments, the following parameters are defined for the QTBT partitioning scheme:
 CTU size: the root node size of a quadtree, the same concept as in HEVC,
 MinQTSize: the minimum allowed quadtree leaf node size,
 MaxBTSize: the maximum allowed binary tree root node size,
 MaxBTDepth: the maximum allowed binary tree depth, and
 MinBTSize: the minimum allowed binary tree leaf node size.

Figure 11:
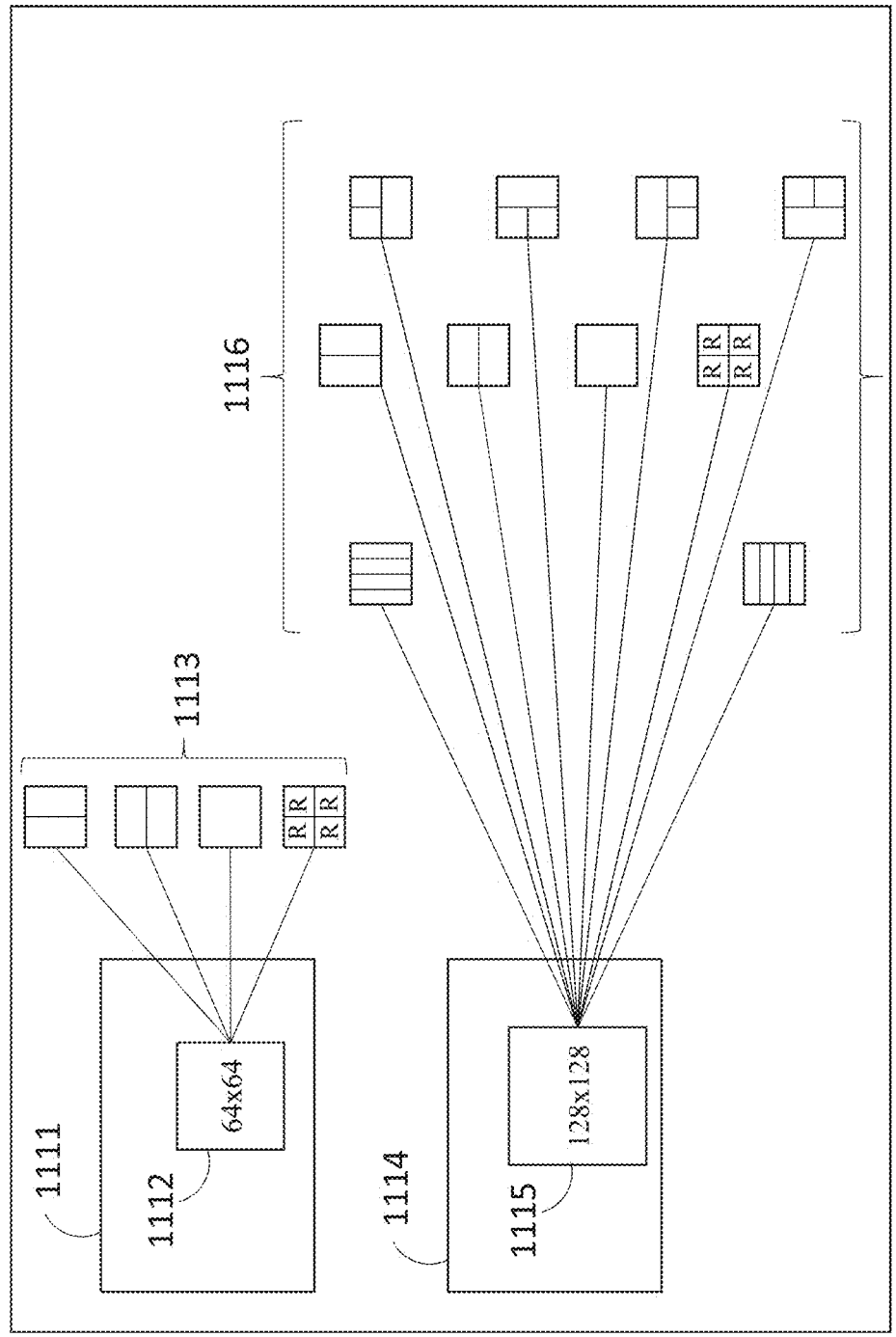
FIG. 11 is a simplified illustration of a diagram in accordance with some embodiments.

In one example of the QTBT partitioning structure, the CTU size is set as 128×128 luma samples with two corresponding 64×64 blocks of chroma samples, the MinQTSize, where QT is Quad Tree, is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes at S12 or S15. The quadtree leaf nodes may have a size from 16×16 (i.e., the MinQTSize) to 128×128 (i.e., the CTU size). If the leaf quadtree node is 128×128, it will not be further split by the binary tree since the size exceeds the MaxBTSize (i.e., 64×64) as checked at S14. Otherwise, the leaf quadtree node could be further partitioned by the binary tree at S15. Therefore, the quadtree leaf node is also the root node for the binary tree and it has the binary tree depth as 0. When the binary tree depth reaches MaxBTDepth (i.e., 4), no further splitting is considered at S14. When the binary tree node has width equal to MinBTSize (i.e., 4), no further horizontal splitting is considered at S14. Similarly, when the binary tree node has height equal to MinBTSize, no further vertical splitting is considered at S14. Signals at S16 are provided, as discussed below with respect to syntaxes which describe QT/TT/BT size, for the procession such as for the leaf nodes of the binary tree that are further processed by prediction and transform processing, at S17 and similarly as discussed herein with respect to such prediction and transform processing, without any further partitioning. Such signaling may also be provided at S13 after S12 as shown in FIG. 11 according to exemplary embodiments. In the JEM, the maximum CTU size is 256×256 luma samples.

In addition according to embodiments, a QTBT scheme supports the ability/flexibility for the luma and chroma to have a separate QTBT structure. Currently, for P and B slices, the luma and chroma coding tree blocks (CTBs) in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT as implemented in the JEM-7.0, these restrictions are removed.

FIG. 10C represents a simplified block diagram 1100 VVC with respect to a Multi-type-tree (MTT) structure 1002 that is included, which is a combination of the illustrated a quadtree (QT) with nested binary trees (BT) and triple-/ternary trees (TT), a QT/BT/TT. A CTU or CU is first partitioned recursively by a QT into square shaped blocks. Each QT leaf may then be further partitioned by a BT or TT, where BT and TT splits can be applied recursively and interleaved but no further QT partitioning can be applied. In all relevant proposals, the TT splits a rectangular block vertically or horizontally into three blocks using a 1:2:1 ratio (thus avoiding non-power-of-two widths and heights). For partition emulation prevention, additional split constraints are typically imposed on the MTT, as shown in the simplified diagram 1002 of FIG. 10C, QT/BT/TT block partitioning in VVC, with respect to blocks 1103 (quad), 1104 (binary, JEM), and 1105 (ternary) to avoid duplicated partitions (e.g. prohibiting a vertical/horizontal binary split on the middle partition resulting from a vertical/horizontal ternary split). Further limitations may be set to the maximum depth of the BT and TT.

Key benefits of such triple-tree partitioning, noted as the ternary block 1105 above, are that, as a complement to quad-tree and binary-tree partitioning, triple-tree partitioning is able to capture objects which locate in block center while quad-tree and binary-tree are always splitting along block center, and the width and height of the partitions of the proposed triple trees are always power of 2 so that no additional transforms are needed.

The design of two-level tree is mainly motivated by complexity reduction. Theoretically, the complexity of traversing of a tree is TD, where T denotes the number of split types, and D is the depth of tree.

FIG. 11 shows an example 1100 of block partitioning in VP9 and AV1, where an example coding tree unit (CTU) 1111 of VP9 shows that VP9 uses a 4-way partition tree starting from the 64×64 level 1112 down to 4×4 level 1113, with some additional restrictions for blocks 8×8 and below as shown in the top half of level 1113. Note that partitions designated as R refer to as recursive in that the same partition tree is repeated at a lower scale until there is reached a lowest 4×4 level. An example CTU 1104 of AV1 not only expands the partition-tree to a 10-way structure 1116, but also increases the largest size (referred to as superblock in VP9/AV1 parlance) to start from a 128×128 level 1115. Note that this includes 4:1/1:4 rectangular partitions that did not exist in VP9. And none of the rectangular partitions can be further subdivided. In addition, AV1 adds more flexibility to the use of partitions below 8×8 level, in the sense that 2×2 chroma inter prediction become possible on certain cases.

And in HEVC, a coding tree unit (CTU) may be split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. One of key features of the HEVC structure is that it has the multiple partition conceptions including CU, PU, and TU. In HEVC, a CU or a TU can only be square shape, while a PU may be square or rectangular shape for an inter predicted block. In HEVC, one coding block may be further split into four square sub-blocks, and transform is performed on each sub-block, i.e., TU. Each TU can be further split recursively (using quadtree split) into smaller TUs, which is called Residual Quad-Tree (RQT). And at picture boundary, HEVC employs implicit quad-tree split so that a block will keep quad-tree splitting until the size fits the picture boundary.

Figure 12:
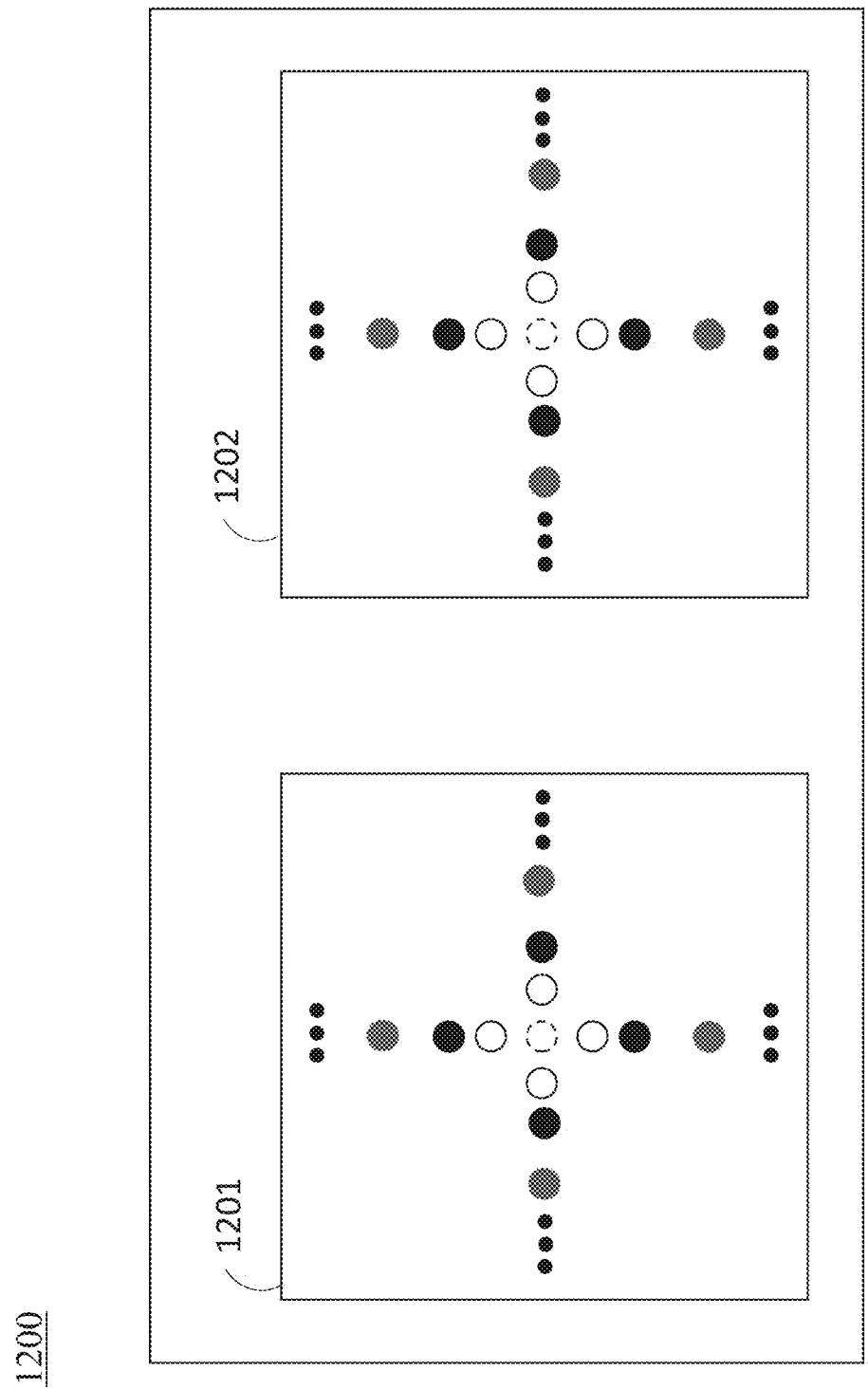
FIG. 12 is a simplified illustration of a diagram in accordance with some embodiments.

Also, FIG. 12 shows an example 1200 related to a merge mode with motion vector difference (MMVD) according to exemplary embodiments. For example, in addition to merge mode, where the implicitly derived motion information is directly used for prediction samples generation of the current CU, the merge mode with motion vector differences (MMVD) is introduced in VVC. And a MMVD flag may be signaled right after sending a skip flag and merge flag to specify whether MMVD mode is used for a CU. And in MMVD, after a merge candidate is selected, it is further refined by the signaled motion vector differences (MVDs) information such that the further information includes a merge candidate flag, an index to specify motion magnitude, and an index for indication of motion direction. In MMVD mode, one for the first two candidates in the merge list is selected to be used as MV basis. The merge candidate flag may be signaled to specify which one is used.

A distance index specifies motion magnitude information and indicates the pre-defined offset from the starting point. And FIG. 12 shows an L0 reference 1201 and L1 reference 1202 where an offset is added to either horizontal component or vertical component of starting MV. The relation of distance index and pre-defined offset is specified in Table 1.

TABLE 1

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

According to exemplary embodiments, a direction index represents the direction of the MVD relative to the starting point. The direction index can represent of the four directions as shown in Table 2, below. The meaning of an MVD sign could be variant according to the information of starting MVs. For example, when the starting MVs is an uni-prediction MV or bi-prediction MVs with both lists point to the same side of the current picture (i.e. (picture order counts (POCs) of two references are both larger than the POC of the current picture, or are both smaller than the POC of the current picture), the sign in Table 2 specifies the sign of MV offset added to the starting MV. And/or when the starting MVs is bi-prediction MVs with the two MVs point to the different sides of the current picture (i.e. the POC of one reference is larger than the POC of the current picture, and the POC of the other reference is smaller than the POC of the current picture), and the difference of POC in list 0 is greater than the one in list 1, the sign in Table 2 specifies the sign of MV offset added to the list0 MV component of starting MV and the sign for the list1 MV has opposite value. Otherwise, if the difference of POC in list 1 is greater than list 0, the sign in Table 2 specifies the sign of MV offset added to the list1 MV component of starting MV and the sign for the list0 MV has opposite value.

According to exemplary embodiments, an MVD may be scaled according to the difference of POCs in each direction. If the differences of POCs in both lists are the same, no scaling is needed. Otherwise, if the difference of POC in list 0 is larger than the one of list 1, the MVD for list 1 is scaled. If the POC difference of L1 is greater than L0, the MVD for list 0 is scaled in the same way. If the starting MV is uni-predicted, the MVD is added to the available MV.

TABLE 2

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

According to exemplary embodiments, there may be symmetric MVD coding where an MVD may be scaled according to the difference of POCs in each direction. If the differences of POCs in both lists are the same, no scaling is needed. Otherwise, if the difference of POC in list 0 is larger than the one of list 1, the MVD for list 1 is scaled. If the POC difference of L1 is greater than L0, the MVD for list 0 is scaled in the same way. If the starting MV is uni-predicted, the MVD is added to the available MV.

And according to exemplary embodiments, in VVC, besides the normal unidirectional prediction and bi-directional prediction mode MVD signalling, symmetric MVD mode for bi-directional MVD signalling may be applied. In the symmetric MVD mode, motion information including reference picture indices of both list-0 and list-1 and MVD of list-1 are not signaled but derived. The decoding process of the symmetric MVD mode is as follows:

1. At slice level, variables BiDirPredFlag, RefIdxSymL0 and RefIdxSymL1 are derived as follows:
    If mvd_l1_zero_flag is 1, BiDirPredFlag is set equal to 0.
    Otherwise, if the nearest reference picture in list-0 and the nearest reference picture in list-1 form a forward and backward pair of reference pictures or a backward and forward pair of reference pictures, BiDirPredFlag is set to 1, and both list-0 and list-1 reference pictures are short-term reference pictures. Otherwise BiDirPredFlag is set to 0.
2. At CU level, a symmetrical mode flag indicating whether symmetrical mode is used or not is explicitly signaled if the CU is bi-prediction coded and BiDirPredFlag is equal to 1.

And when the symmetrical mode flag is true, only mvp_l0_flag, mvp_l1_flag and MVD0 are explicitly signaled. The reference indices for list-0 and list-1 are set equal to the pair of reference pictures, respectively. MVD1 is set equal to (−MVD0).

According to exemplary embodiments, there may be inter mode coding in CWG-B018 where in AV1, for each coded block in inter frame, if the mode of current block is not skip mode but inter-coded mode, then another flag is signaled to indicate whether single reference mode or compound reference mode is used to current block, wherein prediction block is generated by one motion vector in single reference mode whereas prediction block is generated by weighted averaging two prediction blocks derived from two motion vectors in compound reference mode.

For example, for a single reference case, the following modes may be signaled:
  NEARMV—use one of the motion vector predictors (MVP) in the list indicated by a DRL (Dynamic Reference List) index
  NEWMV—use one of the motion vector predictors (MVP) in the list signaled by a DRL index as reference and apply a delta to the MVP.
  GLOBALMV—use a motion vector based on frame-level global motion parameters And for compound reference modes, the following modes may be signaled:
  NEAR_NEARMV—use one of the motion vector predictors (MVP) in the list signaled by a DRL index.
  NEAR_NEWMV—use one of the motion vector predictors (MVP) in the list signaled by a DRL index as reference and send a delta MV for the second MV.
  NEW_NEARMV—use one of the motion vector predictors (MVP) in the list signaled by a DRL index as reference and send a delta MV for the first MV.
  NEW_NEWMV—use one of the motion vector predictors (MVP) in the list signaled by a DRL index as reference and send a delta MV for both MVs.
  GLOBAL_GLOBALMV—use MVs from each reference based on their frame-level global motion parameters And according to exemplary embodiments, there may also be a motion vector difference coding in AV1 where AV1 allows ⅛ pixel motion vector precision (or accuracy), and the following syntaxes are used to signal the motion vector difference in reference frame list 0 or list 1:
  mv_joint specifies which components of the motion vector difference are non-zero:
    0 indicates there is no non-zero MVD along either horizontal or vertical direction,
    1 indicates there is non-zero MVD only along horizontal direction, 2 indicates there is non-zero MVD only along vertical direction, and 3 indicates there is non-zero MVD along both horizontal and vertical direction, mv_sign specifies whether motion vector difference is positive or negative, mv_class specifies the class of the motion vector difference, (As shown in Table 3, a higher class means that the motion vector difference has a larger magnitude.)

TABLE 3

Magnitude class for motion vector difference

| MV class | Magnitude of MVD |
| --- | --- |
| MV_CLASS_0 | (0, 2] |
| MV_CLASS_1 | (2, 4] |
| MV_CLASS_2 | (4, 8] |
| MV_CLASS_3 | (8, 16] |
| MV_CLASS_4 | (16, 32] |
| MV_CLASS_5 | (32, 64] |
| MV_CLASS_6 | (64, 128] |
| MV_CLASS_7 | (128, 256] |
| MV_CLASS_8 | (256, 512] |
| MV_CLASS_9 | (512, 1024] |
| MV_CLASS_10 | (1024, 2048] | mv_bit specifies the integer part of the offset between motion vector difference and starting magnitude of each MV class, mv_fr specifies the first 2 fractional bits of the motion vector difference, and mv_hp specifies the third fractional bit of the motion vector difference.

And according to exemplary embodiments, there may be an adaptive MVD resolution in CWG-B092 where for NEW_NEARMV and NEAR_NEWMV mode, the precision of the MVD depends on the associated class and the magnitude of MVD.

Firstly, fractional MVD may be allowed only if MVD magnitude is equal to or less than one-pixel. Secondly, only one MVD value may be allowed when the value of the associated MV class is equal to or greater than MV_CLASS_1, and the MVD value in each MV class is derived as 4, 8, 16, 32, 64 for MV class 1 (MV_CLASS_1), 2 (MV_CLASS_2), 3 (MV_CLASS_3), 4 (MV_CLASS_4), or 5 (MV_CLASS_5). The allowed MVD values in each MV class are illustrated in Table 4:

TABLE 4

Adaptive MVD in each MV magnitude class

| MV class | Magnitude of MVD |
| --- | --- |
| MV_CLASS_0 | (0, 1], {2} |
| MV_CLASS_1 | {4} |
| MV_CLASS_2 | {8} |
| MV_CLASS_3 | {16} |
| MV_CLASS_4 | {32} |
| MV_CLASS_5 | {64} |
| MV_CLASS_6 | {128} |
| MV_CLASS_7 | {256} |
| MV_CLASS_8 | {512} |
| MV_CLASS_9 | {1024} |
| MV_CLASS_10 | {2048} |

In addition, if current block is coded as NEW_NEARMV or NEAR_NEWMV mode, one context is used for signaling mv_joint or mv_class. Otherwise, another context is used for signaling mv_joint or mv_class.

According to exemplary embodiments, there may also be joing MVD coding (JMVD) in CWG-B092 where a new inter coded mode, named as JOINT_NEWMV, may be applied to indicate whether the MVDs for two reference lists are jointly signaled. If the inter prediction mode is equal to JOINT_NEWMV mode, MVDs for reference list 0 and reference list 1 are jointly signaled. So, only one MVD, named as joint_mvd, may be signaled and transmitted to the decoder, and the delta MVs for reference list 0 and reference list 1 are derived from joint_mvd.

A JOINT_NEWMV mode may be signaled together with NEAR_NEARMV, NEAR_NEWMV, NEW_NEARMV, NEW_NEWMV, and GLOBAL_GLOBALMV mode. No additional contexts are added according to exemplary embodiments.

And when JOINT_NEWMV mode is signaled, and the POC distance between two reference frames and current frame is different, MVD is scaled for reference list 0 or reference list 1 based on the POC distance. To be specific, the distance between reference frame list 0 and current frame is noted as td0 and the distance between reference frame list 1 and current frame is noted as td1. If td0 is equal to or larger than td1, joint_mvd is directly used for reference list 0 and the mvd for reference list 1 is derived from joint_mvd based on the equation (1).

$$\text{derived\_mvd} = \frac{td1}{td0} * \text{joint\_mvd} \qquad \text{Eq. (1)}$$

Otherwise, if td1 equal to or larger than td0, joint_mvd is directly used for reference list 1 and the mvd for reference list 0 is derived from joint_mvd based on the equation (2).

$$\text{derived\_mvd} = \frac{td0}{td1} * \text{joint\_mvd} \qquad \text{Eq. (2)}$$

According to exemplary embodiments, there is also an improvement for adapative MVD resolution in CWG-C011 where a new inter coded mode, named as AMVDMV, may be added to a single reference case. When an AMVDMV mode is selected, that selection indicates that AMVD is applied to signal MVD. One flag, named as amvd_flag, may be added under JOINT_NEWMV mode to indicate whether AMVD is applied to joint MVD coding mode or not. And when adaptive MVD resolution is applied to joint MVD coding mode, MVD for two reference frames are jointly signaled and the precision of MVD is implicitly determined by MVD magnitudes. Otherwise, MVD for two (or more than two) reference frames are jointly signaled, and other MVD coding may be applied.

And additional improvements may be made as, with JMVD, there is assumed a linear motion between backward reference frame and forward reference frame, but when a JMVD coding mode is selected for one block, one joint MVD is signaled for both reference frames, and MVD for two reference frames are derived from the joint MVD based on the distance between reference frames and current frame. However, the motion between two reference frames may not be always linear motion as, for example, the motion could become slower or faster from backward reference frame to forward reference frame.

Figure 13:
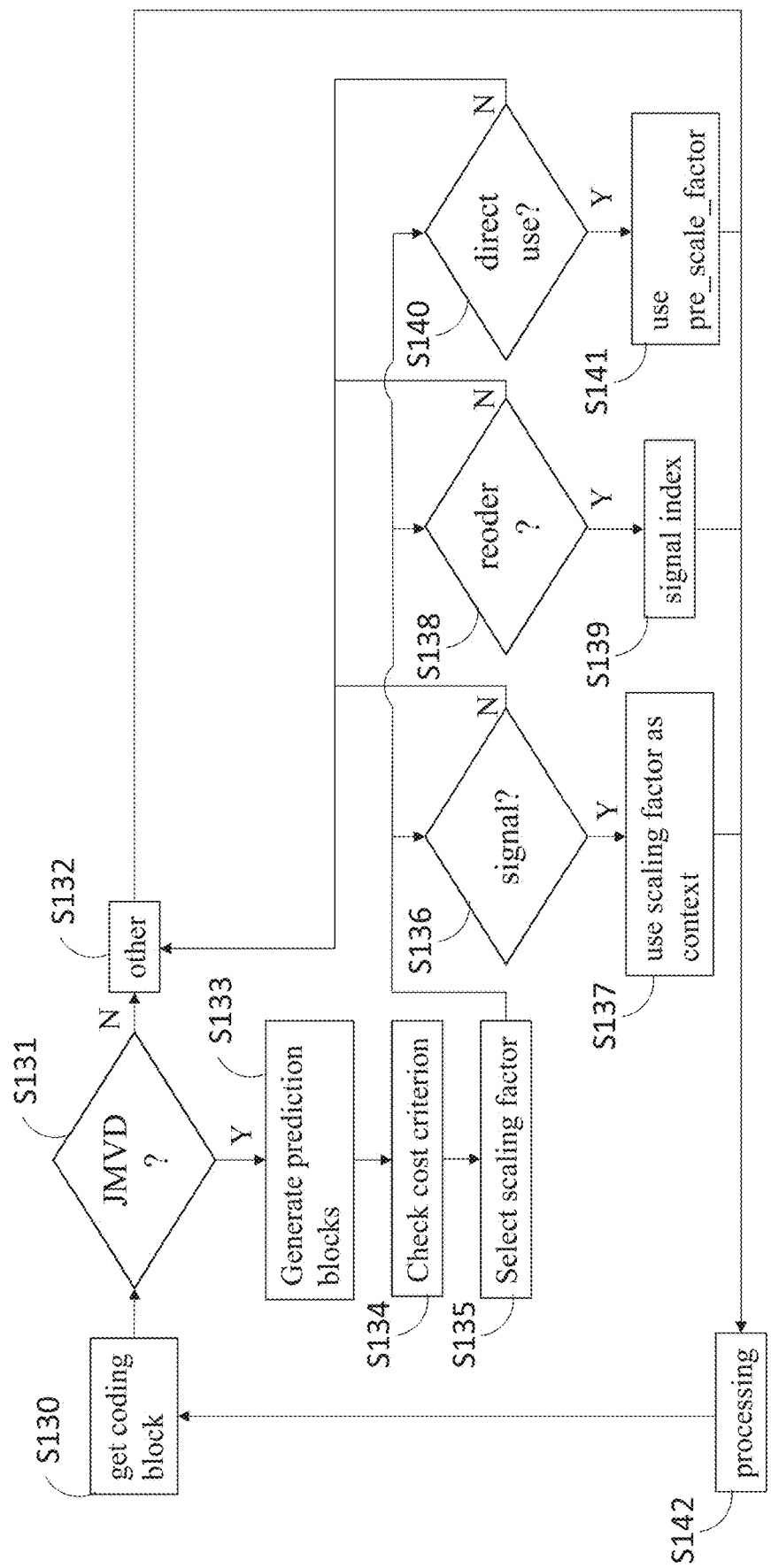
FIG. 13 is a simplified flow illustration in accordance with some embodiments.
Figure 14:
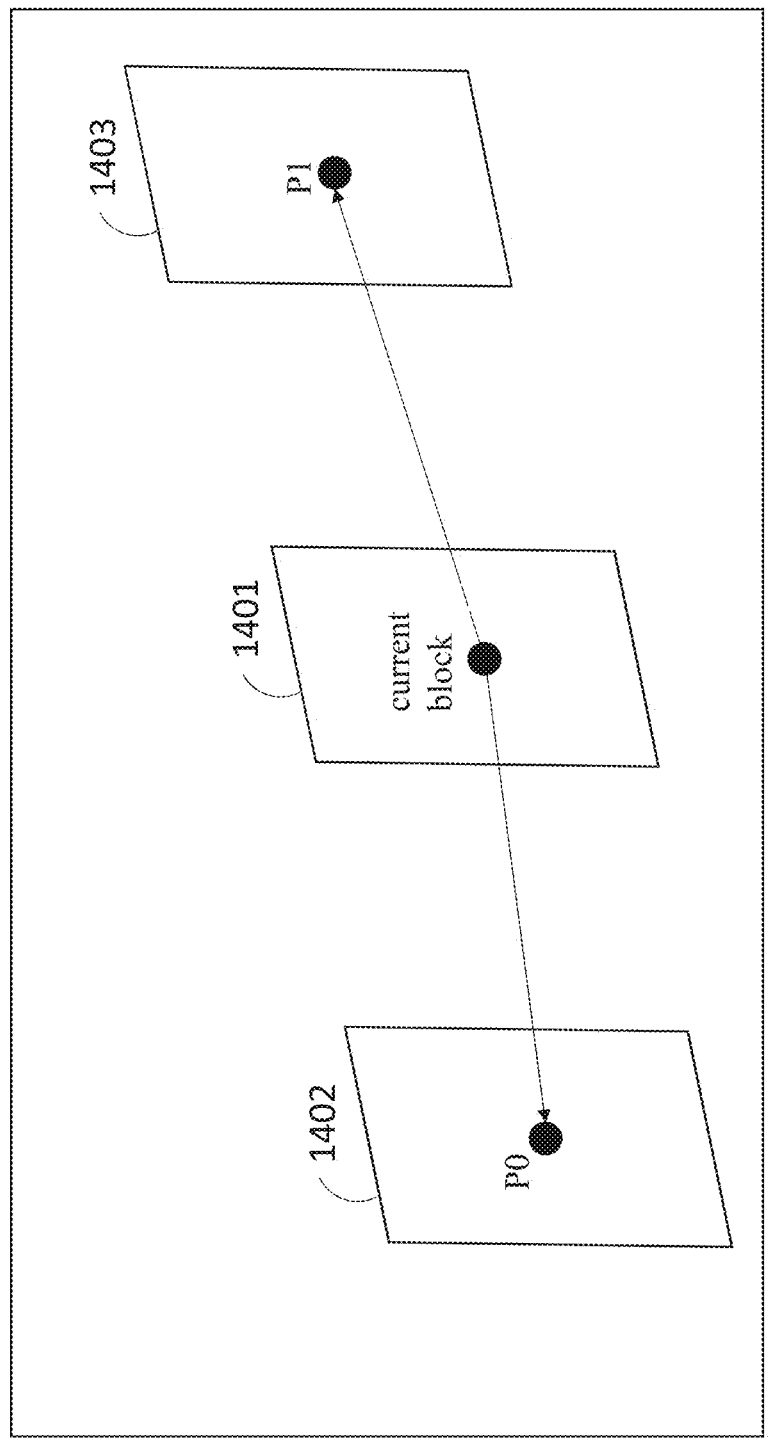
FIG. 14 is a simplified illustration of a diagram in accordance with some embodiments.

As discussed herein the, direction of a reference frame is determined by whether the reference frame is prior to current frame in display order or after current frame in display order. And according to exemplary embodiments, see FIG. 13 illustrating a flowchart 1300 in which at S130 a coding block of a video data is obtained, and at S131, when it is determined that a JMVD mode is selected for one coding block, a list of pre-defined scaling factors may be used to derive the MVD for reference list 0 and/or 1 from the signaled joint MVD. A bilateral matching based method is employed according to exemplary embodiments to derive a predicted scaling factor from the list of pre-defined scale factors. At S133, in exemplary embodiments, for each candidate scaling factor in the pre-defined list, a prediction block P0 1402 and P1 1403, as shown in the example 1400 of FIG. 14 for a current block 1401, are generated at S133 with MV equal to a sum of MVP and scaled MVDs, and then a difference between P0 and P1 is calculated and measured by a cost criterion at S134, and the candidate scaling factor with the minimum cost resulting from such measure is used at S135 as a predicted scaling factor (pred_scale_factor).

According to exemplary embodiments, the cost criterion includes, but not limited to, sum of absolute difference (SAD), sum of squared error (SSE), and sum of absolute transform difference (SATD) features.

At S136, if it is determined to signal using an index or flag of the candidate scaling factors (scaled_jmvd_flag) is signaled, then at S137 the index or flag of the candidate scaling factors (scaled_jmvd_flag) is signaled and the predicted scaling factor is used as the context for entropy coding of scaled_jmvd_flag at S142.

Alternatively, at S138 if it is instead determined to signal the index or flag of the candidate scaling factors (scaled_jmvd_flag) explicitly, then signalling the index or flag of the candidate scaling factors (scaled_jmvd_flag) explicitly is done at S139 along with pred_scale_factor used to reorder the candidate scaling factors, and then the index of the reordered candidate scaling factors is signaled, and coding proceeds at S142 according to JMVD described above.

Alternatively, at S140, if it is determined that, instead of signalling the index or flag of the candidate scaling factors (scaled_jmvd_flag), pred_scale_factor is to be directly used as the scaling factor for deriving the final MVD used for generating prediction block, then at S141 pred_scale_factor is directly used as the scaling factor for deriving the final MVD used for generating prediction block, and then coding proceeds at S142 according to JMVD described above.

Alternatively, at S132 other coding processes may be implemented such as any of the processes described above for the coding block obtained at S130.

According to exemplary embodiments, a scaling process of MVD is the same as the method described in U.S. 63/328,062, filed Apr. 6, 2022, which is incorporated herein in its entirety.

According to exemplary embodiments, the index or flag of the candidate scaling factors (scaled_jmvd_flag) can be either explicitly signaled in the bitstream or implicitly derived from the bilateral matching method (pred_scale_factor), and the selection between explicit signaling and implicit derivation is also signaled at S142.

According to exemplary embodiments, said predicted scaling factor can be derived from a different group of candidate scaling factors comparing to the group candidate scaling factors that are explicitly signaled. And, for example, the candidate scaling factors that are explicitly signaled may include limited number of candidates (e.g., 1, ½, 2), but the predicted scaling factor can be derived from a greater set of candidates (e.g., 1, ⅛, ⅖, ⅜, ⅘, . . . , 15/8, 16/8, . . . , 32/8).

According to exemplary embodiments, for motion vector prediction (MVP), only the neighboring block's MV that is derived using the MVD with explicitly signaled scale factor or a default scale factor (e.g., 1) can be used for deriving the MVP of following coding blocks, such as at S130 after S142. Otherwise, if such neighboring block's MV is derived using the MVD with scale factor derived using bilateral matching, then that neighboring bock's MV is not used for deriving the MVP of such following coding blocks.

According to exemplary embodiments, the candidate scaling factors are derived based on coded information, including, but not limited to any one or more of quantization step size or quantization parameter, block size, inter prediction mode, MVD class, MVD resolution, reference picture, MVP index, and MVD scaling factor of neighboring blocks.

According to exemplary embodiments, the candidate scaling factors are signaled at a high-level syntax, including but not limited to any of a frame header, slice header, and sequence header.

The techniques described above, can be implemented as computer software using computer-readable instructions and physically stored in one or more computer-readable media or by a specifically configured one or more hardware processors. For example, FIG. 15 shows a computer system 1500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 15:
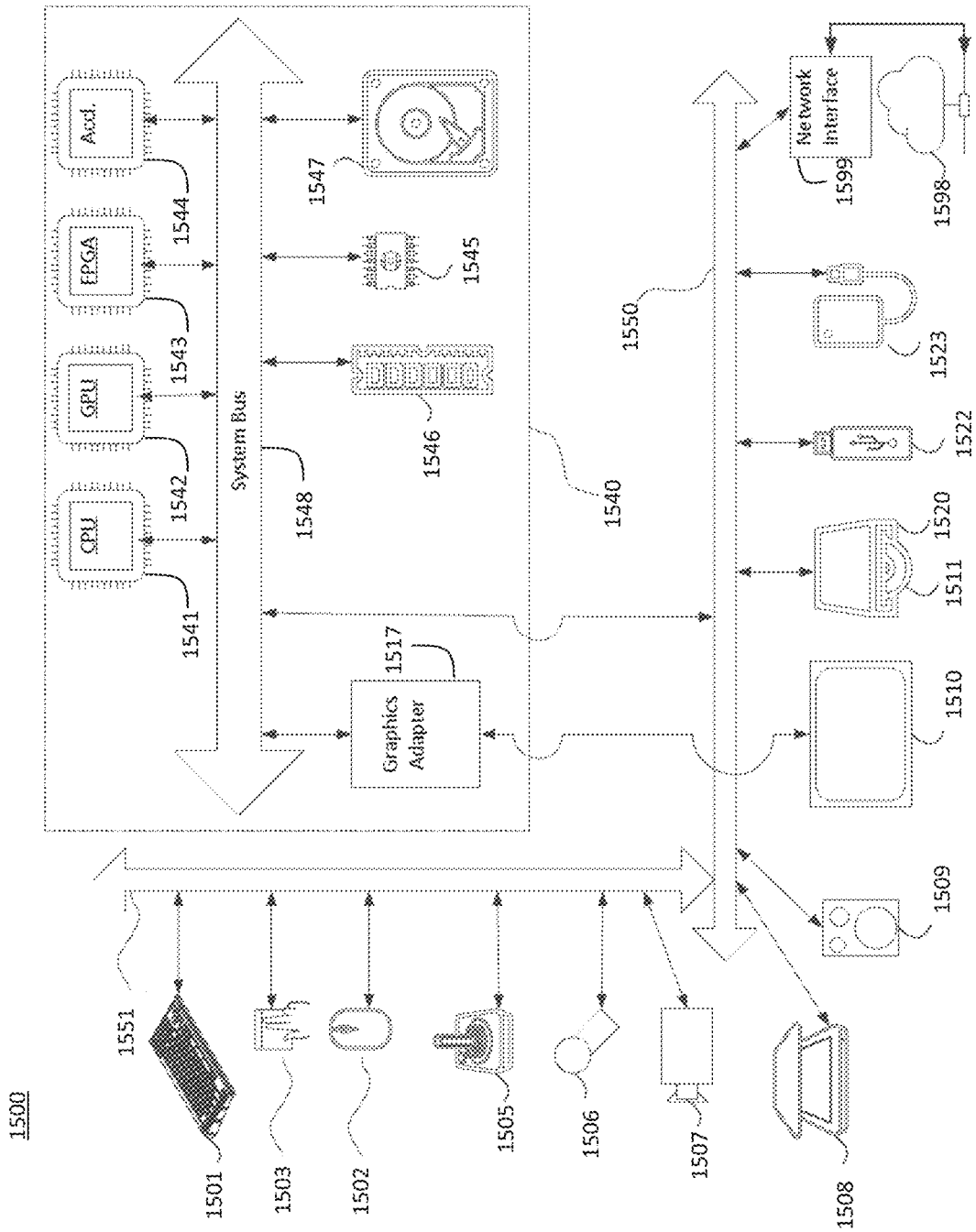
FIG. 15 is a schematic illustration of a diagram in accordance with some embodiments.

The components shown in FIG. 15 for computer system 1500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1500.

Computer system 1500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1501, mouse 1502, trackpad 1503, touch screen 1510, joystick 1505, microphone 1506, scanner 1508, camera 1507.

Computer system 1500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1510, or joystick 1505, but there can also be tactile feedback devices that do not serve as input devices), audio output devices (such as: speakers 1209, headphones (not depicted)), visual output devices (such as screens 1510 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1500 can also include human accessible storage devices and their associated media such as optical media including CD/DVD ROM/RW 1520 with CD/DVD 1511 or the like media, thumb-drive 1522, removable hard drive or solid state drive 1523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1500 can also include interface 1599 to one or more communication networks 1598. Networks 1598 can for example be wireless, wireline, optical. Networks 1598 can further be local, wide-area, metropolitan, vehicular and industrial, real-time, delay-tolerant, and so on. Examples of networks 1598 include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks 1598 commonly require external network interface adapters that attached to certain general-purpose data ports or peripheral buses (1550 and 1551) (such as, for example USB ports of the computer system 1500; others are commonly integrated into the core of the computer system 1500 by attachment to a system bus as described below (for example Ethernet interface into a PC computer system or cellular network interface into a smartphone computer system). Using any of these networks 1598, computer system 1500 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1540 of the computer system 1500.

The core 1540 can include one or more Central Processing Units (CPU) 1541, Graphics Processing Units (GPU) 1542, a graphics adapter 1517, specialized programmable processing units in the form of Field Programmable Gate Areas (FPGA) 1543, hardware accelerators for certain tasks 1544, and so forth. These devices, along with Read-only memory (ROM) 1545, Random-access memory 1546, internal mass storage such as internal non-user accessible hard drives, SSDs, and the like 1547, may be connected through a system bus 1548. In some computer systems, the system bus 1548 can be accessible in the form of one or more physical plugs to enable extensions by additional CPUs, GPU, and the like. The peripheral devices can be attached either directly to the core's system bus 1548, or through a peripheral bus 1551. Architectures for a peripheral bus include PCI, USB, and the like.

CPUs 1541, GPUs 1542, FPGAs 1543, and accelerators 1544 can execute certain instructions that, in combination, can make up the aforementioned computer code. That computer code can be stored in ROM 1545 or RAM 1546. Transitional data can be also be stored in RAM 1546, whereas permanent data can be stored for example, in the internal mass storage 1547. Fast storage and retrieval to any of the memory devices can be enabled through the use of cache memory, that can be closely associated with one or more CPU 1541, GPU 1542, mass storage 1547, ROM 1545, RAM 1546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1500, and specifically the core 1540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1540 that are of non-transitory nature, such as core-internal mass storage 1547 or ROM 1545. The software implementing various embodiments of the present disclosure can be stored in such devices and executed by core 1540. A computer-readable medium can include one or more memory devices or chips, according to particular needs. The software can cause the core 1540 and specifically the processors therein (including CPU, GPU, FPGA, and the like) to execute particular processes or particular parts of particular processes described herein, including defining data structures stored in RAM 1546 and modifying such data structures according to the processes defined by the software. In addition or as an alternative, the computer system can provide functionality as a result of logic hardwired or otherwise embodied in a circuit (for example: accelerator 1544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. In the following, the term block may be interpreted as a prediction block, a coding block, or a coding unit, i.e. CU.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding performed by at least one processor, the method comprising:
   obtaining a coding block of a video bitstream;
   obtaining a joint motion vector difference (JMVD) of the video bitstream;
   deriving a predicted scaling factor based on a list of scaling factors of the video bitstream;
   deriving a motion vector difference (MVD) based on at least the JMVD and the predicted scaling factor;
   reconstructing the coding block based on the derived MVD.

2. The method for video decoding according to claim 1, further comprising:
   determining whether the JMVD is used for predicting the coding block;
   obtaining the list of scaling factors and the JMVD from the video bitstream.

3. The method for video decoding according to claim 2, wherein obtaining the list of scaling factors and the JMVD from the video bitstream is based on determining that the JMVD is used for predicting the coding block.

4. The method for video decoding according to claim 1, further comprising:
   generating, for each of the scaling factors in the list of scaling factors, prediction blocks; and
   signaling a selection of one of the scaling factors based on weighing differences between a cost criterion and respective ones of the prediction blocks,
   wherein the prediction blocks are generated based on respective ones of the scaling factors, and
   wherein ones of the prediction blocks are generated based on a motion vector equal to a sum of a motion vector prediction and a scaled motion vector difference that is scaled by one of the scaling factors,
   wherein the cost criterion is based on at least one of a sum of absolute difference (SAD), a sum of squared error (SSE), and a sum of absolute transform difference (SATD).

5. The method for video decoding according to claim 1, further comprising:
   determining at least one of an index and a flag of the one of the scaling factors.

6. The method for video coding according to claim 5, wherein the index is implicit in the video bitstream.

7. The method for video decoding according to claim 1, further comprising:
   reordering the scaling factors.

8. The method for video decoding according to claim 1, wherein the scaling factors are derived based on at least one of a quantization step size, a quantization parameter, a block size, an inter prediction mode, a motion vector difference (MVD) class, an MVD resolution, a reference picture, a motion vector prediction (MVP) index, and an MVD scaling factor of neighboring blocks.

9. The method for video decoding according to claim 1, further comprising:
   deriving a motion vector prediction (MVP) of at least one coding block, following the coding block, based on the one of the scaling factors.

10. The method for video decoding according to claim 1, wherein a selection of the one of the scaling factors is signaled in at least one of a frame header, a slice header, and a sequence header.

11. For a method video encoding, the method comprising:
    receiving video data comprising at least one picture;
    encoding the video data into encoded video data comprising a coding block of a video bitstream, and the encoded video data corresponding to instructions to:
       obtain a joint motion vector difference (JMVD) of the video bitstream;
       derive a predicted scaling factor based on a list of scaling factors of the video bitstream;
       derive a motion vector difference (MVD) based on at least the JMVD and the predicted scaling factor;
       reconstruct the coding block based on the derived MVD.

12. The method according to claim 11, wherein the encoded video data further corresponding to instructions to:
    determine whether a JMVD is used for predicting the coding block, for each of the scaling factors in the list of scaling factors, prediction blocks; and
    obtain the list of scaling factors and the JMVD from the video bitstream.

13. The method according to claim 12, wherein obtaining the JMVD and the list of scaling factors from the video bitstream is based on determining that the JMVD is used for predicting the coding block.

14. The method according to claim 12, wherein the encoded video data further corresponding to instructions to:
    generate, for each of the scaling factors in the list of scaling factors, prediction blocks; and
    signal a selection of one of the scaling factors based on weighing differences between a cost criterion and respective ones of the prediction blocks,
    wherein the prediction blocks are generated based on respective ones of the scaling factors,
    wherein ones of the prediction blocks are generated based on a motion vector equal to a sum of a motion vector prediction and a scaled motion vector difference that is scaled by one of the scaling factors, and
    wherein the cost criterion is based on at least one of a sum of absolute difference (SAD), a sum of squared error (SSE), and a sum of absolute transform difference (SATD).

15. The method according to claim 11, wherein the encoded video data further corresponding to instructions to:
    determine at least one of an index and a flag of the one of the scaling factors.

16. The method according to claim 15, wherein the index is implicit in the video bitstream.

17. The method according to claim 11, wherein the encoded video data further corresponding to instructions to:
    reorder the scaling factors.

18. The method according to claim 11, wherein the scaling factors are derived based on at least one of a quantization step size, a quantization parameter, a block size, an inter prediction mode, a motion vector difference (MVD) class, an MVD resolution, a reference picture, a motion vector prediction (MVP) index, and an MVD scaling factor of neighboring blocks.

19. The method according to claim 11, wherein the computer program code further comprises:

third deriving code configured to cause the at least one hardware processor to derive a motion vector prediction (MVP) of at least one coding block, following the coding block, based on the one of the scaling factors.

20. A non-transitory computer readable medium storing a video bitstream that is generated by a video encoding method, the video encoding method comprising:

receiving video data comprising at least one picture:

encoding the video data into encoded video data comprising a coding block of a video bitstream, and the encoded video data corresponding to instructions to:

obtain a joint motion vector difference (JMVD) of the video bitstream;

derive a predicted scaling factor based on a list of scaling factors of the video bitstream;

derive a motion vector difference (MVD) based on at least the JMVD and the predicted scaling factor; and reconstruct the coding block based on the derived MVD.

\* \* \* \* \*